US008613666B2

(12) United States Patent
Esaki et al.

(10) Patent No.: US 8,613,666 B2
(45) Date of Patent: Dec. 24, 2013

(54) USER SELECTION AND NAVIGATION BASED ON LOOPED MOTIONS

(75) Inventors: Chris Esaki, Redmond, WA (US); Keiichi Yano, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/872,790

(22) Filed: Aug. 31, 2010

(65) Prior Publication Data

US 2012/0052942 A1 Mar. 1, 2012

(51) Int. Cl.
*A63F 13/00* (2006.01)

(52) U.S. Cl.
USPC .............................................. 463/39; 463/37

(58) Field of Classification Search
USPC ............. 463/1–5, 7–9, 30–34, 36–43, 49–57;
273/108.1, 127 R, 148 R, 148 B, 309,
273/317.1, 340, 343, 348, 361–367, 461;
250/205, 330–334, 338.1, 339.02,
250/339.06, 339.09, 339.11, 339.14, 341.8,
250/342, 344–345, 350–351, 353;
345/1.1–1.3, 2.1–2.3, 3.1–3.4, 24, 419,
345/467–469, 473, 539, 543–544, 625, 636,
345/638, 653–656, 664–666, 682–683, 686,
345/949–950, FOR. 139, FOR. 153;
348/14.15, 39, 42, 47–52, 115, 117,
348/121, 135–137, 141, 211.2, 211.4,
348/211.7–211.8, 211.14, 211.99, 576,
348/588–589, 719, 721, 734, E13.004,
348/E13.064–E13.067;
375/240.15–240.16, 240.25;
398/106–108, 111–112, 118, 123,
398/127–131; 434/37–38, 43–44, 69, 118,
434/240, 256–257; 717/168–178

IPC .... A63F 13/00,13/06, 13/10, 9/24; G06F 17/00
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 1910636 2/2007
CN 101158886 4/2008
(Continued)

OTHER PUBLICATIONS

TMPGEnc DVD Author 3 (DivX Author): DivX Authoring Guide, Digital Digest, [http://www.digital-digest.com/articles/TMPGEnc_DVD_Author_3_DivX_Authoring_Guide_page4.html], Jun. 30, 2007, 13 pages.

(Continued)

*Primary Examiner* — James S McClellan
(74) *Attorney, Agent, or Firm* — Vierra Magen Marcus LLP

(57) ABSTRACT

A system for performing user selection of an option is provided. A user interface displays one or more options. Each option is associated with a sequence of a looped motion. In response, a user will perform one of the displayed sequences of looped motion. User motion data is received from one or more sensors connected to the computing device. The user's progress of performing the sequence of the looped motion is determined based on the user motion data matching one or more looped motion criteria associated with the performed looped motion. The user's progress of performing the sequence of the looped motion is displayed to the user. A selection of the option associated with the performed looped motion is automatically triggered in response to determining that the user has completed the sequence of looped motion.

19 Claims, 22 Drawing Sheets

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,696,892 A * | 12/1997 | Redmann et al. | 345/582 |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,337 B2 | 6/2002 | Cove et al. | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,512,838 B1 | 1/2003 | Rafii et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 * | 11/2008 | Kuraishi | 463/30 |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |

(56) References Cited

U.S. PATENT DOCUMENTS

| | | | |
|---|---|---|---|
| 7,620,202 B2 | 11/2009 | Fujimura et al. | |
| 7,667,122 B2 | 2/2010 | Saijo | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,777,649 B2 | 8/2010 | De Ruyter et al. | |
| 7,809,167 B2 | 10/2010 | Bell | |
| 7,834,846 B1 | 11/2010 | Bell | |
| 7,850,535 B2 | 12/2010 | Noble et al. | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0168176 A1 | 11/2002 | Iizuka et al. | |
| 2004/0005924 A1 | 1/2004 | Watabe et al. | |
| 2005/0210417 A1 | 9/2005 | Marvit et al. | |
| 2006/0050052 A1 | 3/2006 | Mekenkamp et al. | |
| 2006/0230361 A1 | 10/2006 | Jennings et al. | |
| 2006/0250355 A1 | 11/2006 | Miller-Smith | |
| 2007/0122778 A1 | 5/2007 | Beitel et al. | |
| 2008/0026838 A1 | 1/2008 | Dunstan et al. | |
| 2008/0055469 A1 | 3/2008 | Miyasaka et al. | |
| 2008/0152191 A1 | 6/2008 | Fujimura et al. | |
| 2008/0214357 A1 | 9/2008 | Farinelli et al. | |
| 2008/0268943 A1 | 10/2008 | Jacob | |
| 2008/0269018 A1 | 10/2008 | Nurmela et al. | |
| 2008/0314228 A1 | 12/2008 | Dreyfuss et al. | |
| 2009/0106696 A1 | 4/2009 | Duarte | |
| 2009/0117958 A1 | 5/2009 | Ueshima et al. | |
| 2009/0141933 A1 | 6/2009 | Wagg | |
| 2009/0205483 A1 | 8/2009 | Kim | |
| 2009/0221368 A1* | 9/2009 | Yen et al. | 463/32 |
| 2009/0298649 A1 | 12/2009 | Dyer et al. | |
| 2010/0207874 A1* | 8/2010 | Yuxin et al. | 345/156 |
| 2011/0306397 A1 | 12/2011 | Fleming et al. | |

FOREIGN PATENT DOCUMENTS

| | | |
|---|---|---|
| CN | 101254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Brewster, Stephen A., et al., "Making menus musical," Proceedings of the IFIP TC13 International Conference on Human-Computer Interaction, 1997, 8 pages.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using The Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Shiratori, Takaaki, et al, "Dancing-to-Music Character Animation," Eurographics 2006, vol. 25, No. 3, Blackwell Publishing, Oxford, United Kindom and Massachusetts, USA, Sep. 2006, 10 pages.

Lee, Hyun-Chul, et al, "Automatic Synchronization of Background Music and Motion in Computer Animation," Eurographics 2005, vol. 24, No. 3, Blackwell Publishing, Oxford, United Kingdom and Massachusetts, USA, Sep. 2005, 10 pages.

Kim, Tae-Noon, et al., "Rhythmic-Motion Synthesis Based on Motion-Beat Analysis," ACM Transactions on Graphics (TOG), Proceedings of ACM SIGGRAPH 2003, vol. 22, Issue 3, ACM, New York, NY, USA, Jul. 2003, 10 pages.

Cardle, Marc, et al., "Music-Driven Motion Editing: Local Motion Transformations Guided By Music Analysis," Eurographics UK Conference (EGUK), Jun. 2002, 7 pages.

Hahn, James K., et al., "An Integrated Approach to Motion and Sound," Journal of Visualization and Computer Animation, vol. 6, Issue No. 2, pp. 109-123, Jul. 1995, 28 pages.

Mishra, Suneil, et al., "Mapping Motion To Sound And Music In Computer Animation And VE," Department of Electrical Engineering and Computer Science, The George Washington University, Proceedings of Pacific Graphics, World Scientific Publishing Co. Pte, Ltd., Aug. 1995, 16 pages.

U.S. Appl. No. 12/872,781, filed Aug. 31, 2010.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD—Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, pp. 90-102, University of Texas at Austin, Austin, TX.

Shao et al., "An Open System Architecture for a Multimedia and Multimodal User Interface", Aug. 24, 1998, 8 pages, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, 35 pages, Germany.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, 121 pages, The Robotics Institute, Carnegie Mellon University, Pittsburgh, PA.

He, "Generation of Human Body Models", Apr. 2005, 111 pages, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, 145 pages, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

(56) References Cited

OTHER PUBLICATIONS

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, pp. 602-605, vol. 15, No. 6, IEEE Transactions on Pattern Analysis and Machine Intelligence.

Granieri et al., "Simulating Humans in VR", The British Computer Society, Oct. 1994, pp. 1-4, 6-9, 12, 15-16, and 18-21 (15 pages) Academic Press.

Brogan et al., "Dynamically Simulated Characters in Virtual Environments", Sep./Oct. 1998, pp. 58-69, vol. 18, Issue 5, IEEE Computer Graphics and Applications.

Fisher et al., "Virtual Environment Display System", ACM Workshop on Interactive 3D Graphics, Oct. 1986, 12 pages, Chapel Hill, NC.

"Virtual High Anxiety", Tech Update, Aug. 1995, pp. 22.

Sheridan et al., "Virtual Reality Check", Technology Review, Oct. 1993, pp. 21-28, vol. 96, No. 7.

Stevens, "Flights into Virtual Reality Treating Real-World Disorders", The Washington Post, Mar. 27, 1995, Science Psychology, 2 pages.

"Simulation and Training", 1994, 6 pages, HP Division Incorporated.

English Machine-translation of Japanese Publication No. JP08-044490 published on Feb. 16, 1996.

Office Action dated Oct. 10, 2012, U.S Appl. No. 12/872,781, 65 pages.

Response to Office Action filed Nov. 16, 2012, U.S. Appl. No. 12/872,781, 13 pages.

Final Office Action dated Mar. 1, 2013 in U.S. Appl. No. 12/872,781, 25 pages.

Response to Office Action dated Sep. 2, 2013 in U.S. Appl. No. 12/872,781, 16 pages.

Office Action dated Oct. 10, 2013 in U.S. Appl. No. 12/872,781, 27 pages.

First Office Action with date of dispatch of Oct. 8, 2013 in CN Patent Application No. 201110266403.7, 16 pages.

Response to Office Action dated Oct. 24, 2013 in CN Patent Application No. 201110266403.7, 28 pages.

English Abstract of CN1910636 published Feb. 7, 2007.

English Abstract of CN101158886 published Apr. 9, 2008.

\* cited by examiner

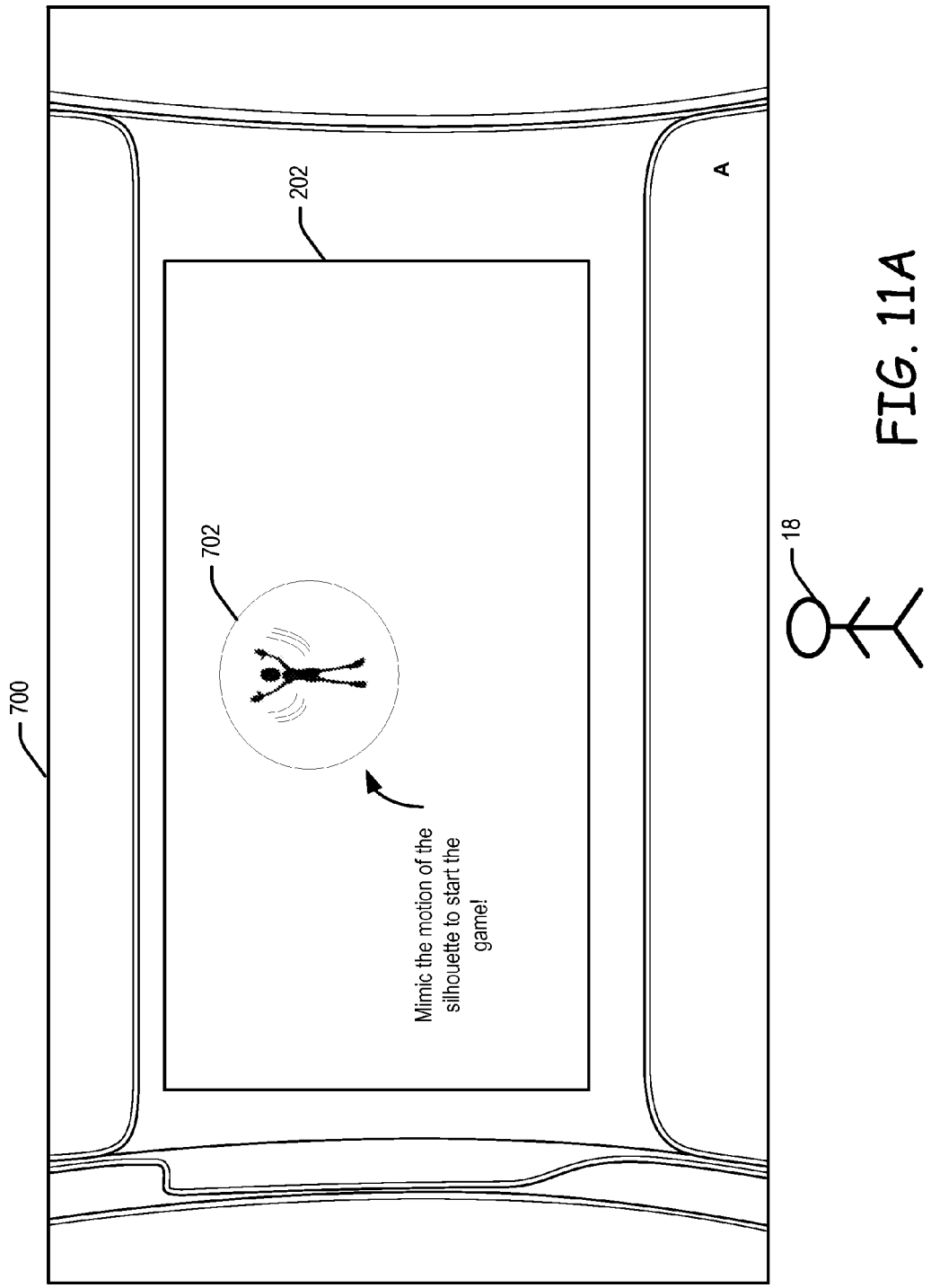

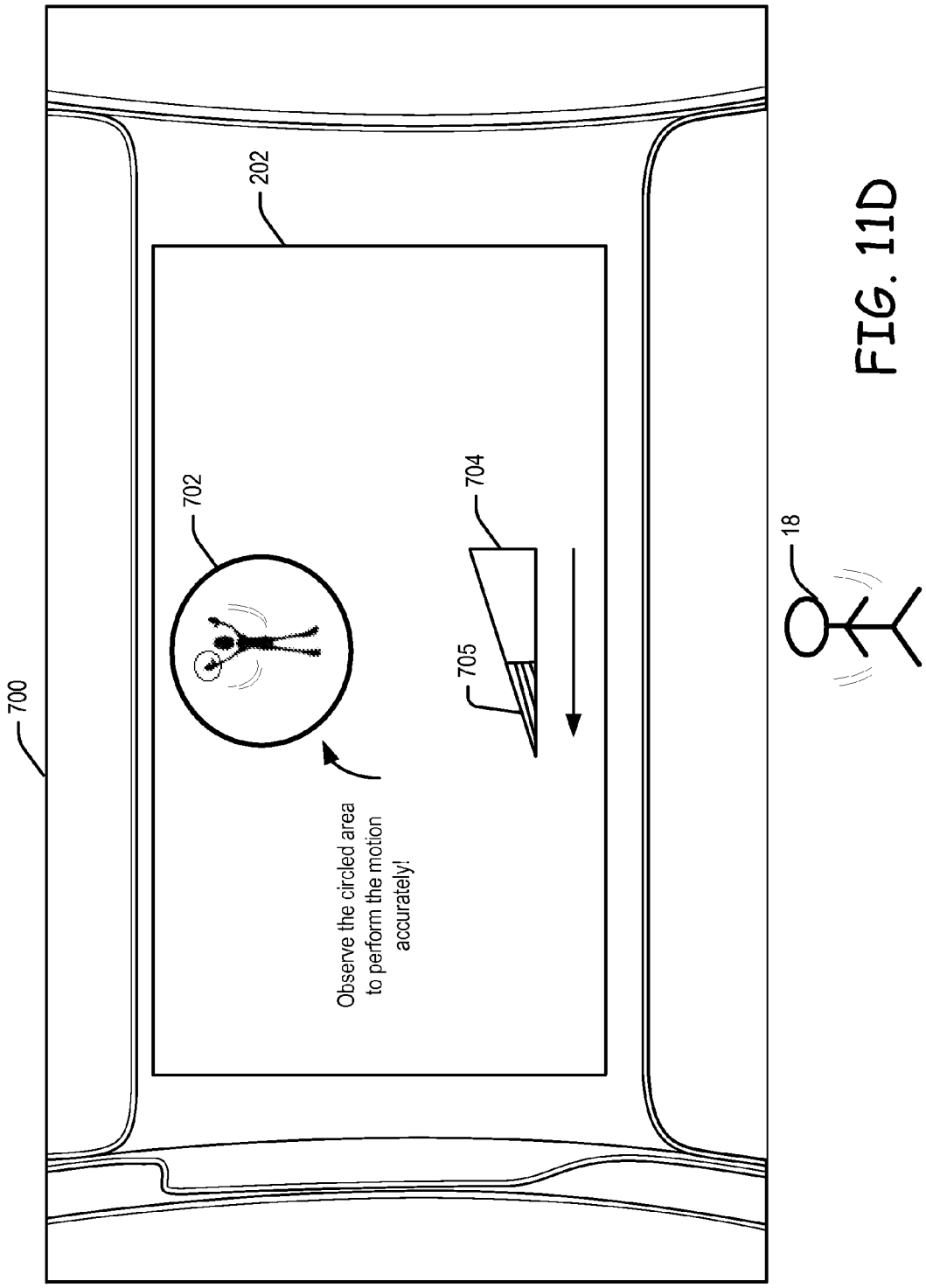

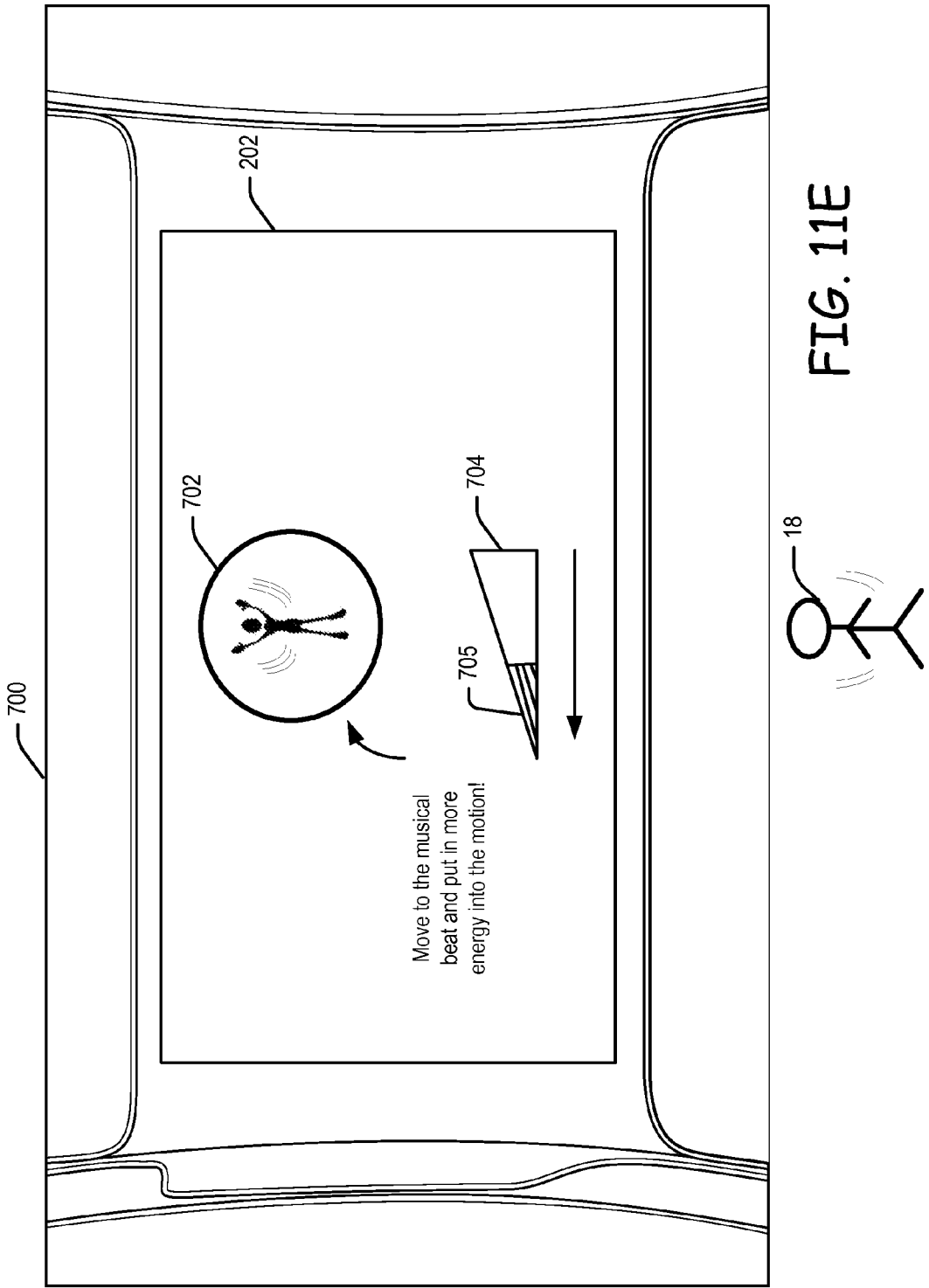

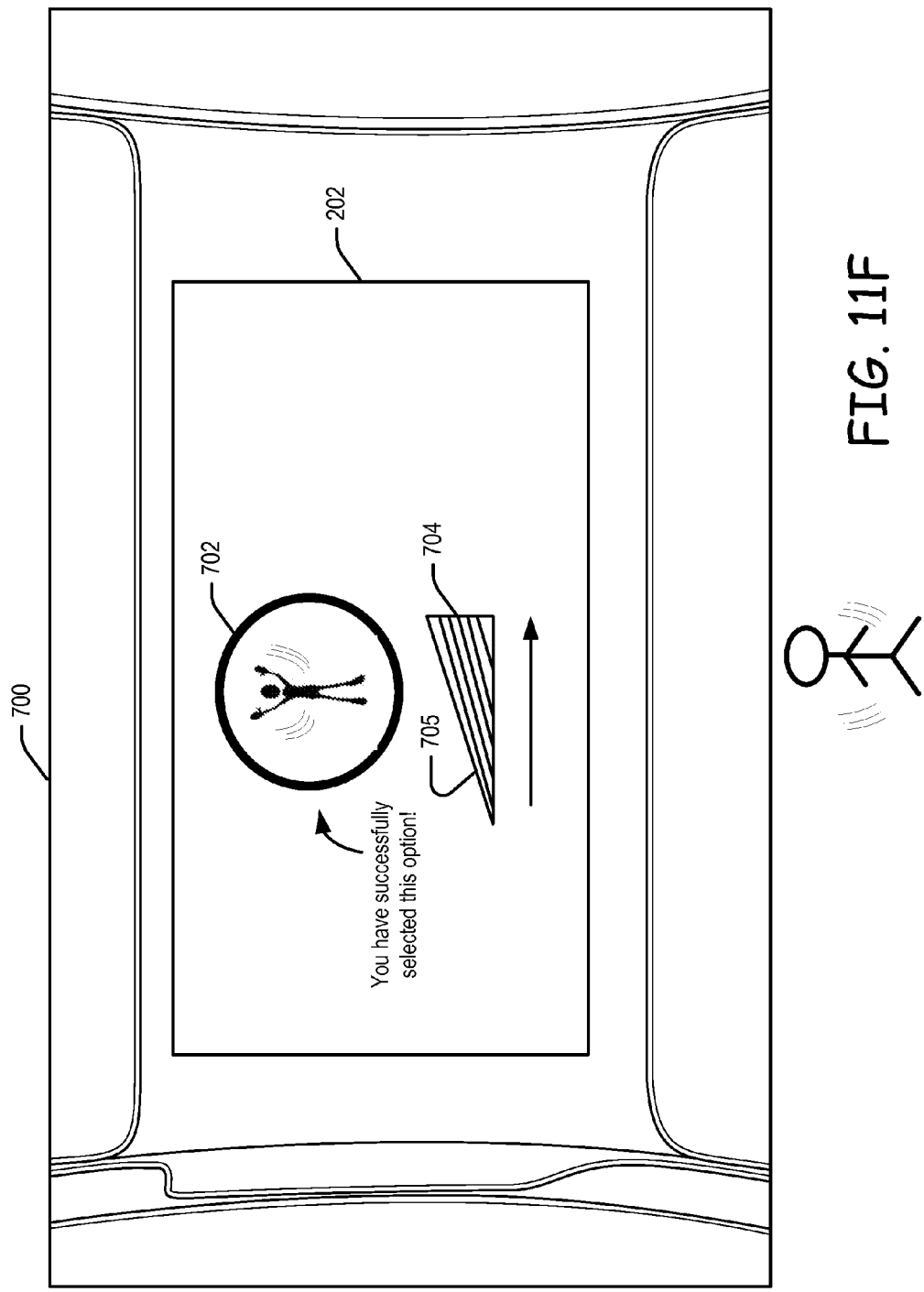

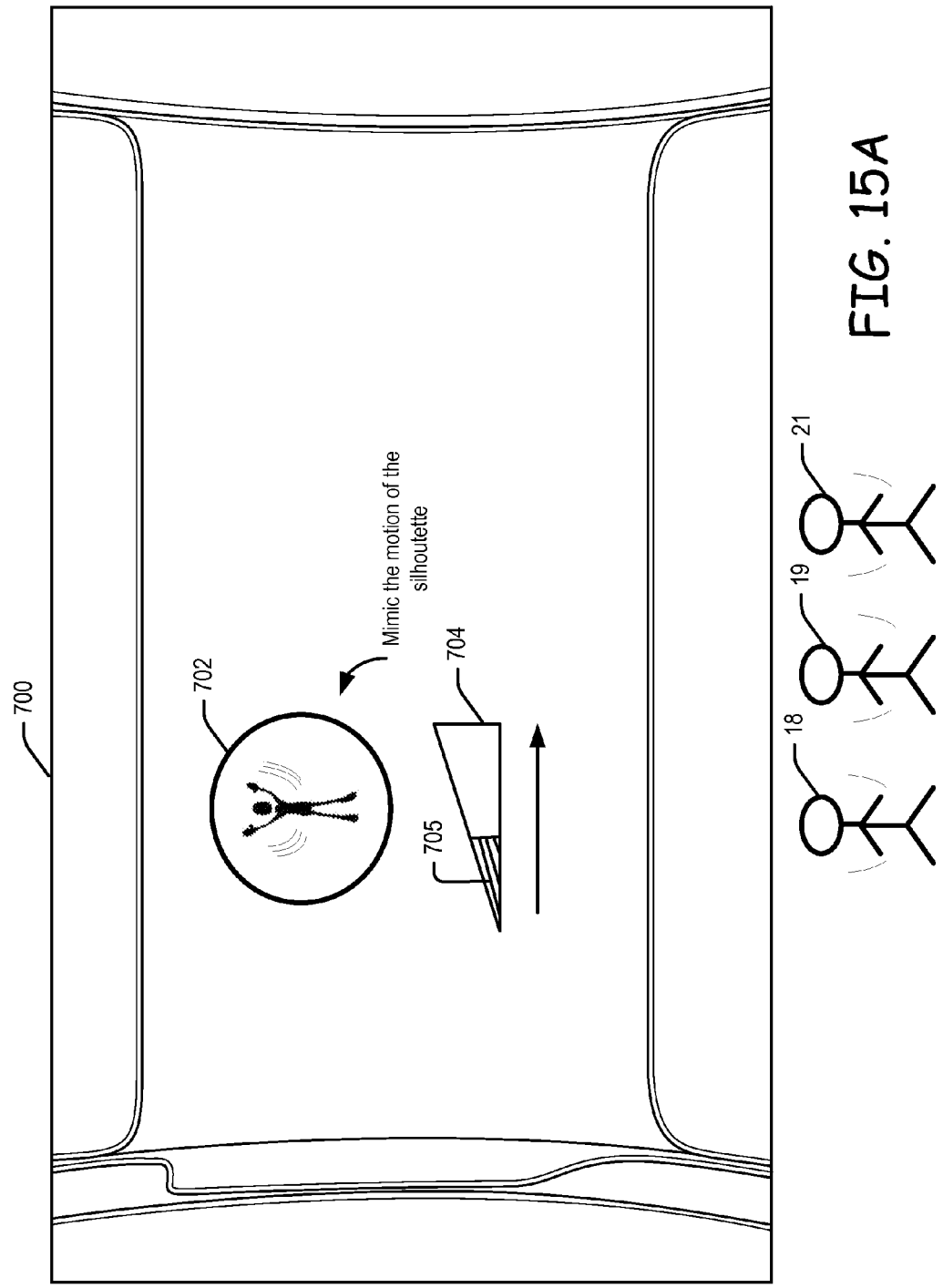

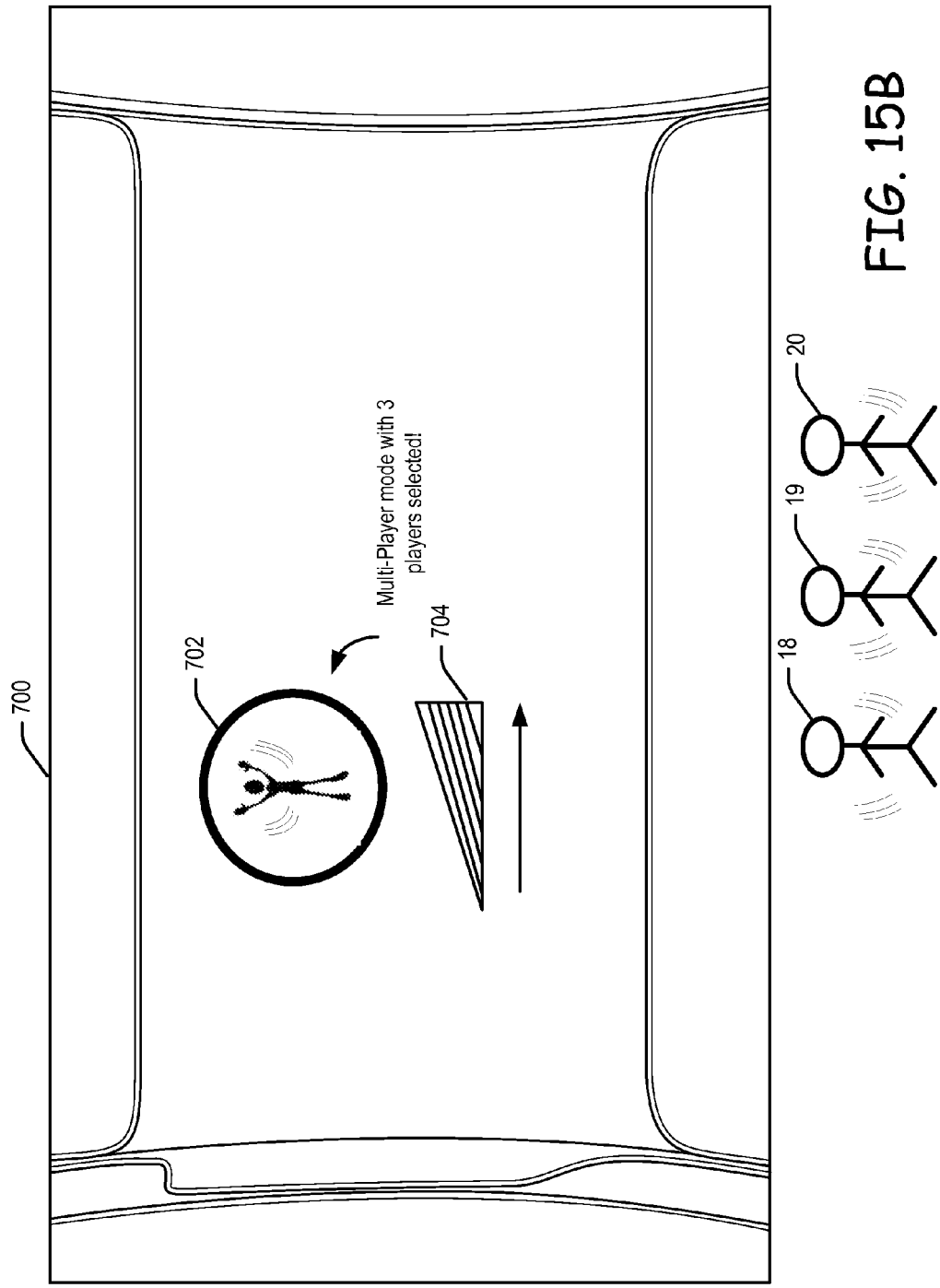

USER SELECTION AND NAVIGATION BASED ON LOOPED MOTIONS

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications.

SUMMARY

Technology is disclosed by which a looped motion may be used to automatically navigate and select user options displayed in an application executing in a computing device without the need for a traditional controller or pointing device. A looped motion is a motion that ends where it starts and is repeated. Examples of a looped motion include an exercise routine or a dance move. In one embodiment of the disclosed technology, a user is prompted to perform a sequence of a looped motion displayed by an option via a user interface in the computing device. A selection of the option is automatically triggered when the user successfully completes the sequence of the looped motion displayed by the option.

In one embodiment, the options displayed by the application may also include one or more skill-based options. The skill-based options display different sequences of looped motion to the user. Each skill-based option has different skill levels associated with performing a sequence of a looped motion. A selection of a particular skill-based option is automatically triggered when the user successfully completes the sequence of the looped motion displayed by the skill-based option.

In another embodiment, a selection of a single-player mode or a multi-player mode for an option is automatically triggered depending on the number of users that simultaneously interact with the application.

In one embodiment, a method for performing user selection of an option is disclosed. A user is prompted to perform a sequence of a looped motion via a user interface of a computing device. The user interface displays the sequence of the looped motion to the user. User motion data is received from a sensor connected to the computing device. The user's progress of performing the sequence of the looped motion is determined based on the user motion data matching one or more looped motion criteria associated with performing the looped motion. The user's progress of performing the sequence of the looped motion is displayed to the user. A selection of the option is automatically triggered in response to determining that the user has completed the sequence of looped motion.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 11A-11F illustrate various user interface screens depicting a user's interaction with an application executing on a computing device, in accordance with one embodiment of the present invention.

FIGS. 15A and 15B illustrate various user interface screens depicting a user's interaction with an application executing on a computing device, in accordance with yet another embodiment of the present invention.

DETAILED DESCRIPTION

Technology is disclosed by which a looped motion may be used to automatically trigger the selection and navigation of user options displayed in an application executing in a computing device. A sequence of a looped motion is displayed to a user via a user interface in the computing device. User motion data is captured using a capture device connected to the computing device. The user's progress of performing the sequence of the looped motion is determined based on the user motion data and the user's progress is displayed to the user via the user interface. A selection of an option displayed via the user interface is automatically triggered when the user successfully completes performing the sequence of the looped motion.

Figure 1:
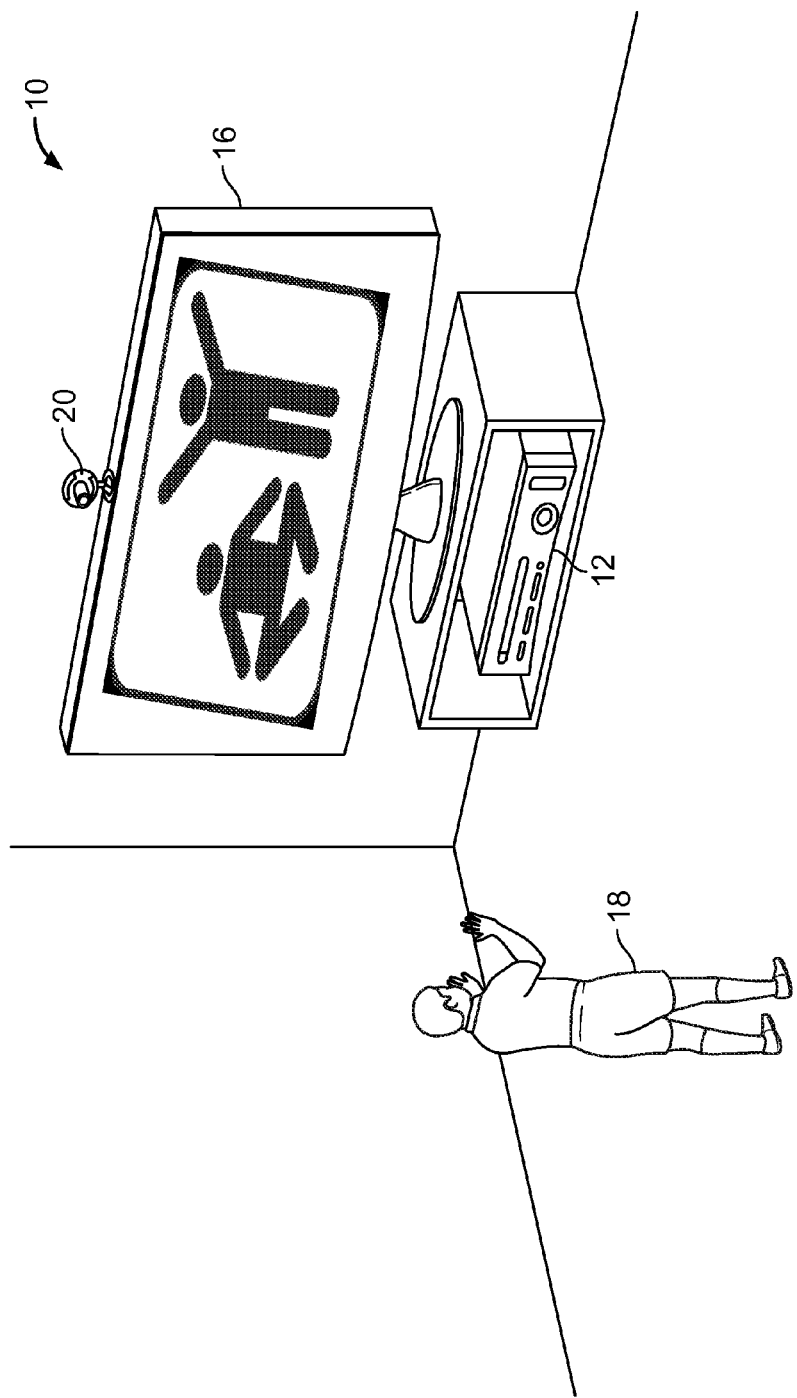
FIG. 1 illustrates one embodiment of a tracking system with a user interacting with an application.

FIG. 1 illustrates one embodiment of a target recognition, analysis and tracking system 10 (generally referred to as a tracking system hereinafter) for performing the operations of the disclosed technology. The target recognition, analysis and tracking system 10 may be used to recognize, analyze, and/or track a human target such as the user 18. As shown in FIG. 1, the tracking system 10 may include a computing device 12. The computing device 12 may be a computer, a gaming system or console, or the like. According to one embodiment, the computing device 12 may include hardware components and/or software components such that the computing device 12 may be used to execute applications such as gaming applications, non-gaming applications, or the like. In one embodiment, computing device 12 may include a processor such as a standardized processor, a specialized processor, a microprocessor, or the like that may execute instructions stored on a processor readable storage device for performing the processes described herein.

As shown in FIG. 1, the tracking system 10 may further include a capture device 20. The capture device 20 may be, for example, a camera that may be used to visually monitor one or more users, such as the user 18, such that gestures performed by the one or more users may be captured, analyzed, and tracked to control various aspects of an application executing on the computing device 12.

According to one embodiment, the tracking system 10 may be connected to an audiovisual device 16 such as a television, a monitor, a high-definition television (HDTV), or the like that may provide game or application visuals and/or audio to a user such as the user 18. For example, the computing device 12 may include a video adapter such as a graphics card and/or an audio adapter such as a sound card that may provide audiovisual signals associated with the game application, non-game application, or the like. The audiovisual device 16 may receive the audiovisual signals from the computing device 12 and may output the game or application visuals and/or audio associated with the audiovisual signals to the user 18. According to one embodiment, the audiovisual device 16 may be connected to the computing device 12 via, for example, an S-Video cable, a coaxial cable, an HDMI cable, a DVI cable, a VGA cable, or the like.

The target recognition, analysis and tracking system 10 may be used to recognize, analyze, and/or track one or more human targets such as the user 18. For example, the user 18 may be tracked using the capture device 20 such that the movements of user 18 may be interpreted as controls that may be used to affect an application or operating system being executed by computing device 12. In one embodiment, and as will be discussed below, the application may include an interactive exercise game or an interactive dance game.

Figure 2:
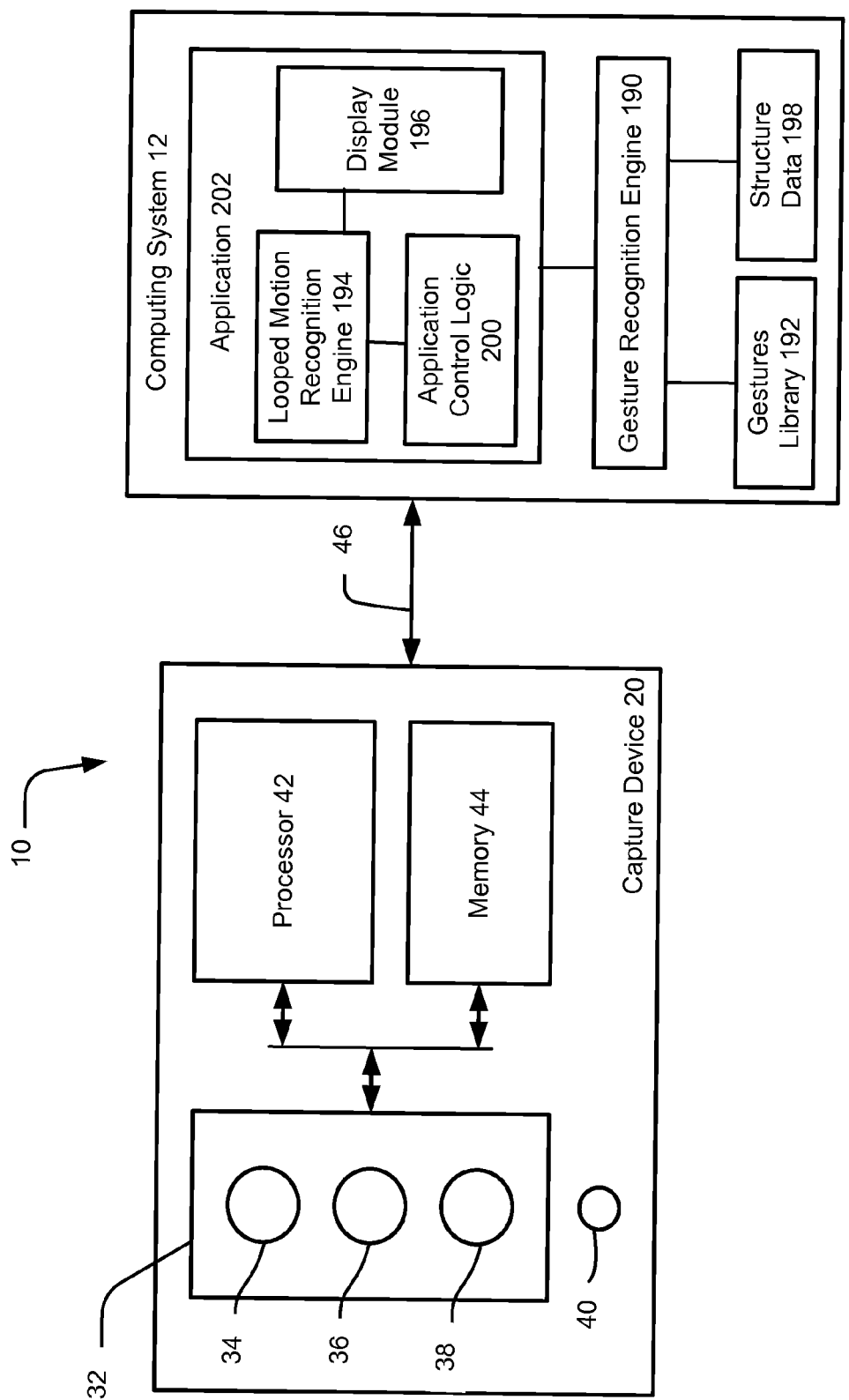
FIG. 2 illustrates one embodiment of a capture device that may be used as part of the tracking system.

FIG. 2 illustrates one embodiment of a capture device 20 and computing device 12 that may be used in the target recognition, analysis and tracking system 10 to recognize human and non-human targets in a capture area and uniquely identify them and track them in three dimensional space. According to one embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z-axis extending from the depth camera along its line of sight.

As shown in FIG. 2, the capture device 20 may include an image camera component 32. According to one embodiment, the image camera component 32 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2, the image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more targets and objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects.

According to one embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more targets or objects in the capture area, the pattern may become deformed in response. Such a deformation of the pattern may be captured by, for example, the 3-D camera 36 and/or the RGB camera 38 and may then be analyzed to determine a physical distance from the capture device to a particular location on the targets or objects.

According to one embodiment, the capture device 20 may include two or more physically separated cameras that may view a capture area from different angles, to obtain visual stereo data that may be resolved to generate depth information. Other types of depth image sensors can also be used to create a depth image.

The capture device 20 may further include a microphone 40. The microphone 40 may include a transducer or sensor that may receive and convert sound into an electrical signal. According to one embodiment, the microphone 40 may be used to reduce feedback between the capture device 20 and the computing device 12 in the target recognition, analysis and tracking system 10. Additionally, the microphone 40 may be used to receive audio signals that may also be provided by the user to control applications such as game applications, non-game applications, or the like that may be executed by the computing device 12.

In one embodiment, the capture device 20 may further include a processor 42 that may be in operative communication with the image camera component 32. The processor 42 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 20 may further include a memory component 44 that may store the instructions that may be executed by the processor 42, images or frames of images captured by the 3-D camera or RGB camera, user profiles or any other suitable information, images, or the like. According to one example, the memory component 44 may include random access memory (RAM), read only memory (ROM), cache, Flash memory, a hard disk, or any other suitable storage component. As shown in FIG. 2, the memory component 44 may be a separate component in communication with the image capture component 32 and the processor 42. In another embodiment, the memory component 44 may be integrated into the processor 42 and/or the image capture component 32. In one embodiment, some or all of the components 32, 34, 36, 38, 40, 42 and 44 of the capture device 20 illustrated in FIG. 2 are housed in a single housing.

The capture device 20 may be in communication with the computing device 12 via a communication link 46. The communication link 46 may be a wired connection including, for example, a USB connection, a Firewire connection, an Ethernet cable connection, or the like and/or a wireless connection such as a wireless 802.11b, g, a, or n connection. The computing device 12 may provide a clock to the capture device 20 that may be used to determine when to capture, for example, a scene via the communication link 46.

The capture device 20 may provide the depth information and images captured by, for example, the 3-D camera 36 and/or the RGB camera 38, including a skeletal model that may be generated by the capture device 20, to the computing device 12 via the communication link 46. The computing device 12 may then use the skeletal model, depth information, and captured images to, for example, create a virtual screen and control an application such as a game or word processor.

Computing device 12 includes gestures library 192, structure data 198 and a gesture recognition engine 190. Gestures library 192 may include a collection of gesture filters, each comprising information concerning a motion or gesture that may be performed by the skeletal model (as the user moves). In one embodiment, the gesture filters may include information concerning one or more looped motions or gestures that may be performed by the user. Looped motions may include, for example, repeatable motions such as knee bends, jumping jacks, sit-ups, push-ups, leg extensions or toe-touches in an exercise routine or dance moves such as arm rolls, open turns, free spins or heel turns in a dance routine.

Structure data 198 includes structural information about objects that may be tracked. For example, a skeletal model of a human may be stored to help understand movements of the user and recognize body parts. Structural information about inanimate objects may also be stored to help recognize those objects and help understand movement.

In one embodiment, the gesture recognition engine 190 may compare the data captured by the cameras 36, 38 and device 20 in the form of the skeletal model and movements associated with it to the gesture filters in the gesture library 192 to identify when a user (as represented by the skeletal model) has performed one or more gestures. Computing device 12 may use the gestures library 192 to interpret movements of the skeletal model and to control an application based on the movements. More information about the gesture recognition engine 190 can be found in U.S. patent application Ser. No. 12/422,661, "Gesture Recognition System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety. More information about motion detection and tracking can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety.

Computing device 12 may include an application 202. In one example, application 202 may be an interactive exercise game application that includes a variety of exercise routines or an interactive dance game application that includes a variety of dance moves. In one embodiment, a user may perform one or more exercise routines or dance moves depicted by application 202 and the user's progress towards successfully completing the various exercise routines or dance moves may be tracked via the application. In one example, a user may interact with application 202 by performing looped motions. Looped motions may include, for example, repeatable motions such as knee bends, jumping jacks, sit-ups, push-ups, leg extensions or toe-touches in an exercise routine or dance moves such as arm rolls, open turns, free spins or heel turns in a dance routine. In one embodiment of the disclosed technology, and as will be discussed in detail below, a user may perform a looped motion to automatically select one or more user options displayed by the application.

A user may interact with application 202 via a user interface in the computing device. In one example, the user interface may display one or more options to the user, in which each option displays a sequence of a looped motion. A sequence of a looped motion may include, for example, a repeatable motion sequence that has to be successfully repeated for a pre-defined number of times, by the user. The options depicted via the user interface may display an on-screen representation of a character performing the looped motion and the user may be prompted to perform the sequence of the looped motion depicted by the on-screen representation, in one example. A selection of an option may automatically be triggered by application 202 when the user successfully completes the sequence of the looped motion depicted by the option.

In another embodiment of the disclosed technology, the user interface may also display one or more skilled-based options to the user. Each skill-based option may display different sequences of looped motion to the user, in which the different sequences of looped motion each have different skill levels associated with performing a sequence of a looped motion. In this embodiment, a user may choose to perform a sequence of a looped motion depicted by any one of the skill-based options by performing the sequence of the looped motion depicted by a particular skill-based option. A selection of the particular skill-based option may automatically be triggered by application 202, when the user successfully completes the sequence of the looped motion depicted by the particular skill-based option.

Application 202 may include a looped motion recognition engine 194, a display module 196 and application control logic 200, in one embodiment. Looped motion recognition engine 194, display module 196 and application control logic 200 may be implemented as software modules to perform one or more operations of the disclosed technology. Application control logic 200 may include a collection of pre-programmed rules related to the execution of application 202. In one embodiment, application control logic 200 may receive information from the gesture recognition engine 190 that the user is performing a gesture such as a looped motion. For example, gesture recognition engine 190 may compare the user motion data received from one or more sensors in the capture device 20 to one or more gesture filters to determine if the user motion data matches one or more gestures or looped motions stored in the gesture recognition engine 190.

Figure 9:
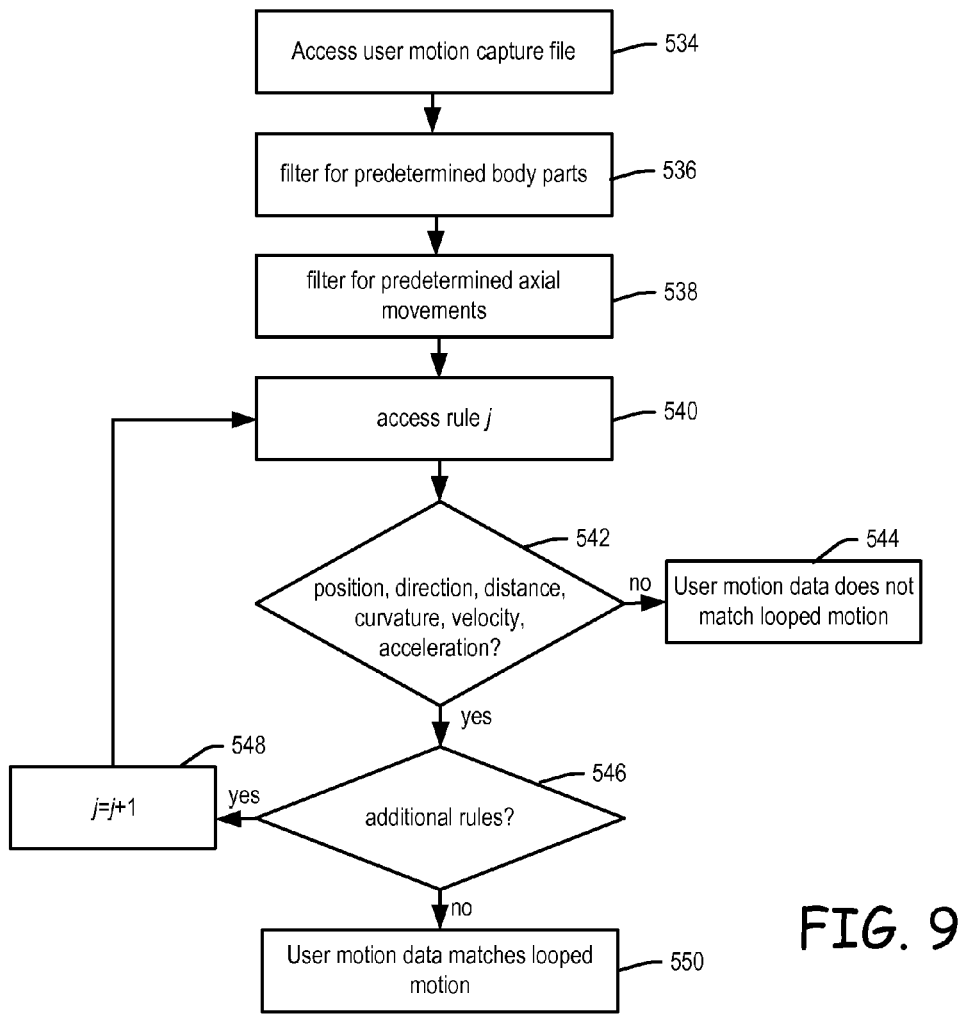
FIG. 9 is a flowchart describing one embodiment of a process of determining if the user is performing a looped motion.

The manner in which the gesture recognition engine 190 determines whether the user motion data matches a looped motion is discussed in FIG. 9.

In one embodiment, application control logic 200 may also receive a user motion capture file (or other data container/structure) from gesture recognition engine 190. The user motion capture file may include, for example, information about the user motion data such as for example, the position, direction, acceleration and curvature of each body part associated with the user. Application control logic 200 may provide the user motion capture file to looped motion recognition engine 194 upon receiving information from gesture recognition engine 190 that the user is performing a looped motion. Looped motion recognition engine 196 may utilize information in the user motion capture file to determine if the captured user motion data matches one or more looped motion criteria associated with the looped motion. In one example, the looped motion criteria for a particular looped motion may be stored in a looped motion data structure in the looped motion recognition engine 196. In one embodiment, looped motion recognition engine 196 correlates information in the looped motion data structure to information in the user motion capture file to determine if the user motion data matches one or more looped motion criteria associated with the looped motion. The manner in which looped motion recognition engine 196 determines if the captured user motion matches one or more looped motion criteria is discussed in detail in FIG. 10.

Application control logic 200 may utilize information provided by the looped motion recognition engine 194 to determine the user's progress of performing a sequence of a looped motion. Display module 196 may display the user's progress of performing the sequence of the looped motion. Application control logic 200 may further determine that the user has completed the sequence of looped motion based on determining the user's progress of performing the sequence of the looped motion. In one embodiment, application control logic 200 may trigger a selection of an option displayed in the user interface in response to determining that the user has completed the sequence of the looped motion depicted by the option. The user selection of the option may be displayed to the user via display module 196. The manner in which modules 190, 194, 196 and 200 interact with each other to perform one or more operations of the disclosed technology is discussed in detail in FIGS. 5-10.

Figure 3:
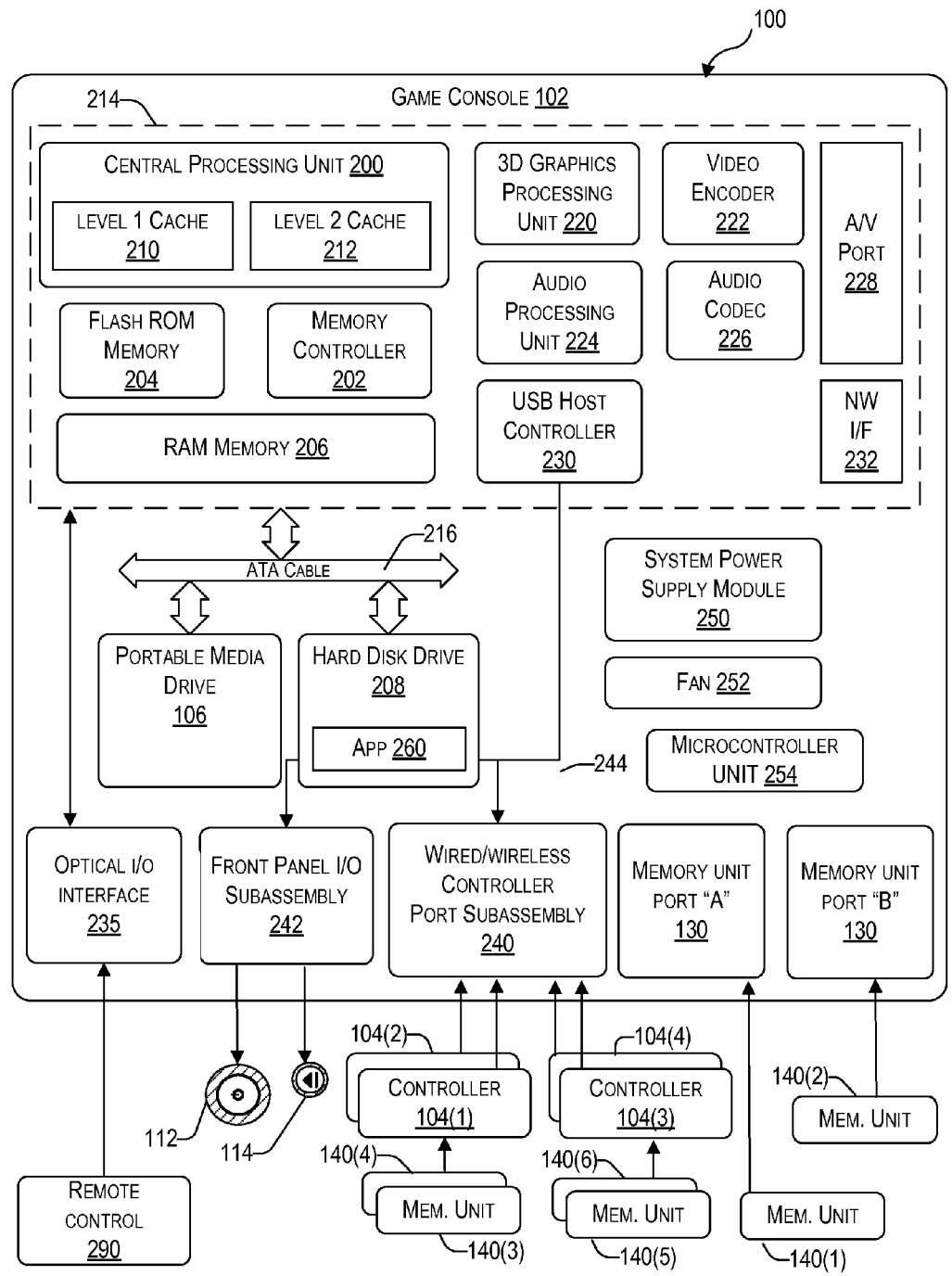
FIG. 3 illustrates one embodiment of a computing device that may be used to track motion and update an application based on the tracked motion.

FIG. 3 illustrates an example of a computing device 100 that may be used to implement the computing device 12 of FIG. 1-2. The computing device 100 of FIG. 3 may be a multimedia console 100, such as a gaming console. As shown in FIG. 3, the multimedia console 100 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 3 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 3, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community.

Figure 4:
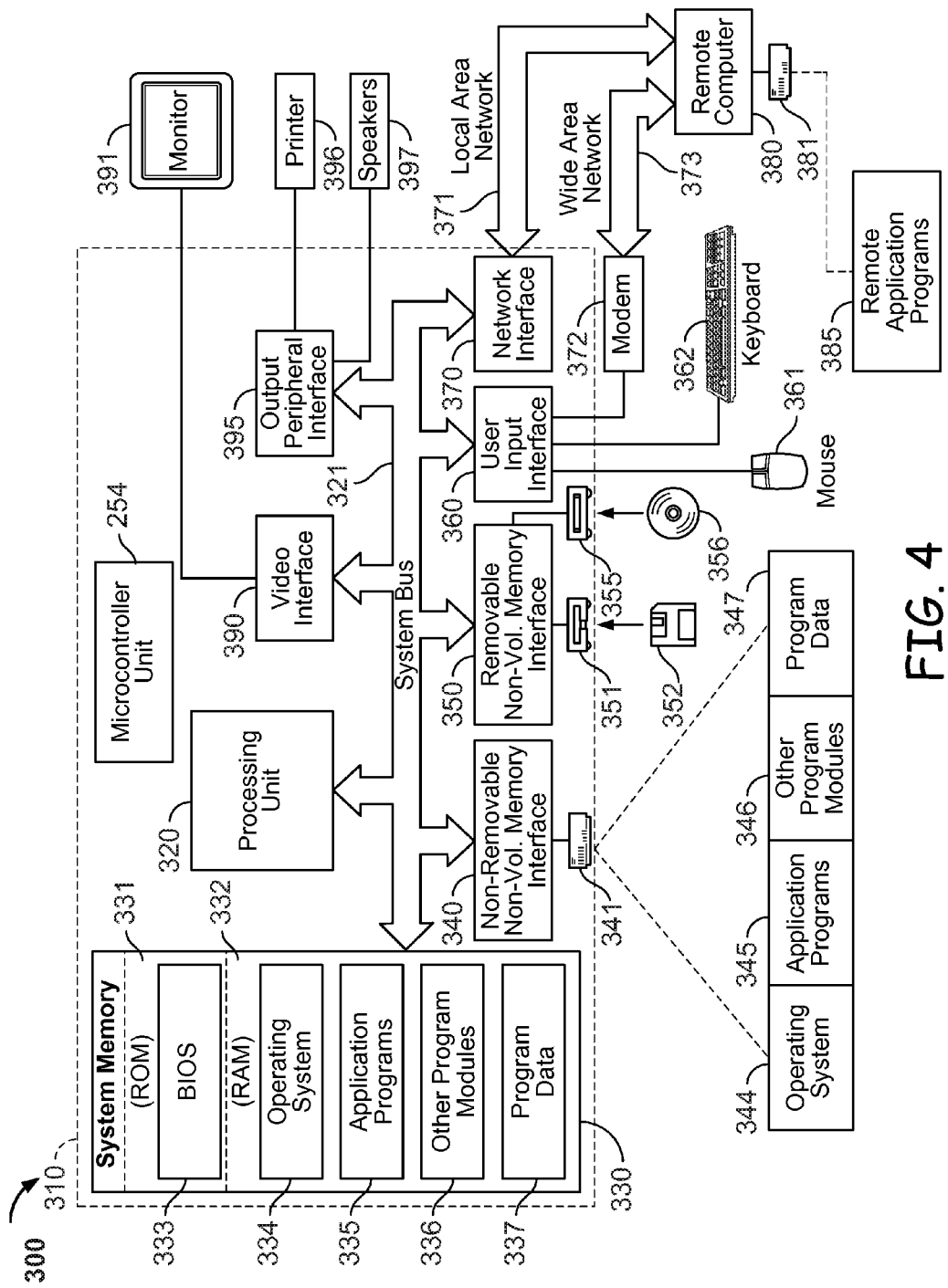
FIG. 4 illustrates one embodiment of a computing device that may be used to track motion and update an application based on the tracked motion.

FIG. 4 illustrates a general purpose computing device which can be used to implement another embodiment of computing device 12. With reference to FIG. 4, an exemplary system for implementing embodiments of the disclosed technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337.

The computer 310 may also include other removable/non-removable, volatile/nonvolatile computer storage media. By way of example only, FIG. 4 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. In FIG. 4, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections depicted in FIG. 4 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 4 illustrates remote application programs 385 as residing on memory device 381. It will be appreciated that the network connections shown are exemplary and other means of establishing a communications link between the computers may be used.

Figure 5:
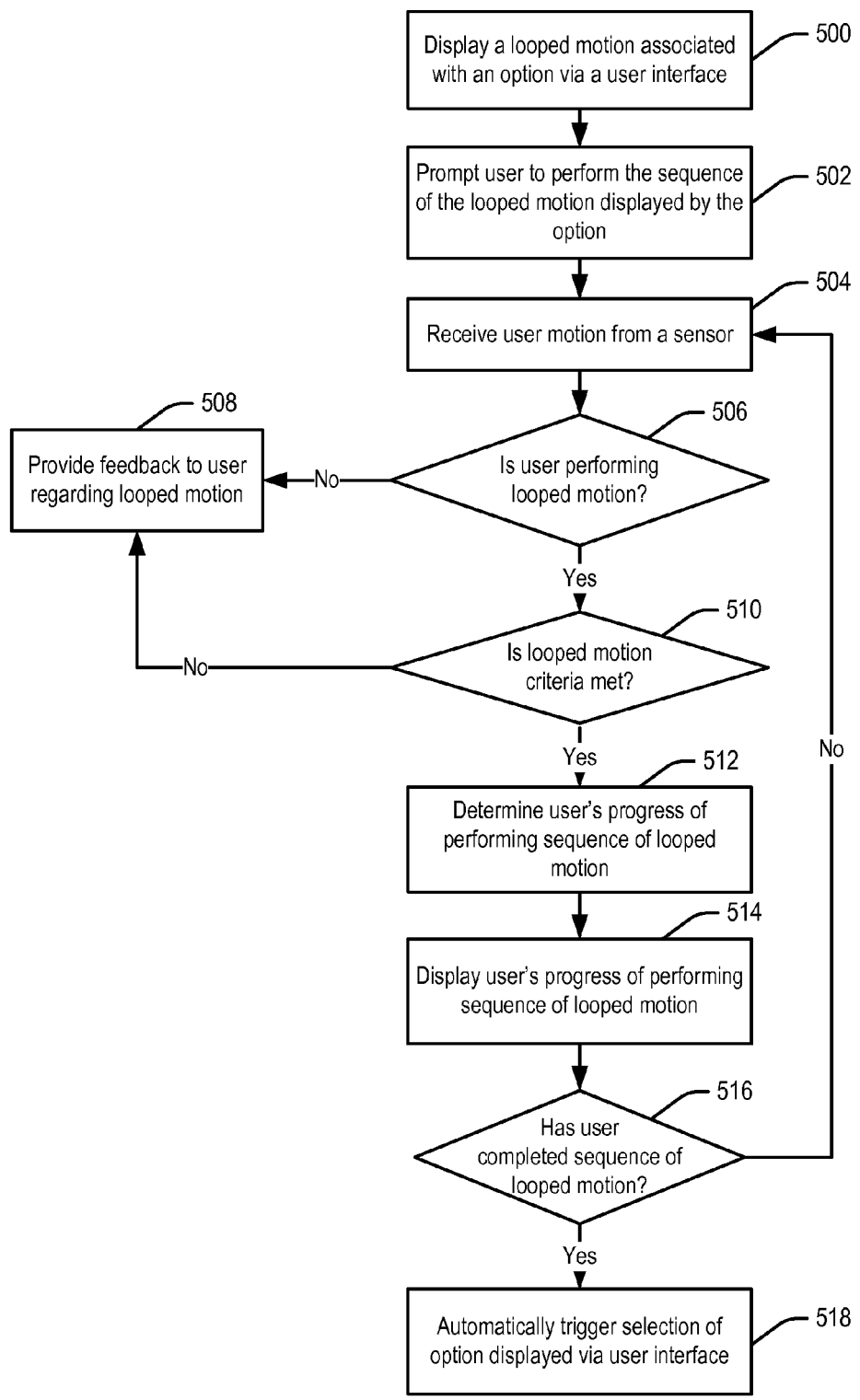
FIG. 5 is a flowchart describing one embodiment of a process for allowing a user to select an option in a user interface by using a looped motion.

As discussed above, the hardware devices of FIGS. 1-4 can be used to implement a system that allows a user to select an option depicted in an application by performing a looped motion. FIG. 5 is a flowchart describing one embodiment of a process for allowing a user to select an option in a user interface by using a looped motion. In one embodiment, the steps of FIG. 5 may be performed by software modules in the gesture recognition engine 190, the application control logic 200, the loop recognition engine 194 and/or the display module 196. The process of FIG. 5 is performed during the use of a software application. For example, during a video game or video exercise program, the game or program may provide a user with the choice one, two or more options. The choice of the one, two or more options may be displayed on a user interface (e.g., on monitor 16 of FIG. 1).

In some embodiments, the application may utilize a user identity for the person interacting with the application. The user identity can include identity/contact information, preferences, history of the user's performance of the application (and other applications), purchasing information, etc. In one embodiment, a user identity is determined by a user providing a username and password. In another embodiment, facial recognition may be used to correlate the user's face from a received visual image with a reference visual image to determine the user's identity. In another embodiment, determining the user identity may include receiving input from the user identifying their identity. For example, a user profile may be stored by computing device 12 and the user may make an on screen selection to identify themselves as corresponding to that user profile.

In step 500, a set of one or more options are provided to the user on the user interface. One or more looped motions associated with application 202 are displayed to the user on the user interface. In one embodiment, the user interface will display one looped motion for each option. For example, a dance based video game may display a menu having two options. A first option is to play a game. As second option is to receive a demo of how to play a game. The user interface will display a first looped motion (e.g., a first dance move) next to the text "Want to play a game?" and a second looped motion (e.g., a second dance move) next to the text "Want to see a demo of how to play?"

In step 502, the user is prompted to perform the sequences of the looped motions displayed by the option. In one example, the user may be prompted with guided text instructing the user to perform the sequences of the looped motions.

In step 504, user motion data is received from a sensor (e.g., depth sensors, visual camera, microphone, etc). In one embodiment, one or more sensors in the capture device 20 may receive information about the user's motion. The process by which user motion data may be captured and received by the capture device 20 is discussed in FIG. 6.

In step 506, it is determined whether the user is performing the looped motions based on the received user motion data. In one embodiment, step 506 may include determining if the user motion data matches one or more pre-defined looped motions in the gesture recognition engine 190. The process by which the gesture recognition engine 190 determines if the user is performing a looped motion is discussed in FIG. 9. If it is determined that the user is not performing any of the looped motions, then feedback regarding the looped motions is provided to the user, in step 508. In one example, the user may be provided with guided text that describes the manner in which the user may accurately perform the looped motion. Or, for example, an indication of the correct movement of a particular body part while performing the looped motion may be displayed by highlighting or circling a corresponding body part in the on-screen representation of the character performing the looped motion.

In one embodiment, once it is determined that the user is performing one of the looped motions, it is determined whether the user motion data matches one or more looped motion criteria for the detected looped motion in step 510. Looped motion criteria may include a musical beat sequence associated with performing the sequence of the looped motion, the energy produced through a movement of a body part involved in performing the sequence of the looped motion and a match threshold value associated with the sequence of the looped motion, in one example, The process of determining if the user motion data matches one or more looped motion criteria is described in detail in FIG. 10. If it is determined that the user is performing the looped motion, but not in accordance with one or more looped motion criteria, then feedback regarding the manner in which the looped motion may be performed is provided to the user, in step 508. As discussed above, the user may be provided with guided text that describes the manner in which the user may perform the looped motion.

In step 512, the user's progress of performing the sequence of the looped motion is determined based on the user motion data matching the looped motion criteria. A sequence of a looped motion is a looped motion that is performed X times, where is X is a predetermined integer. In one embodiment, the user's progress of performing the sequence of the looped motion may be determined when the user completes a first iteration in the sequence of the looped motion and may be computed as a percentage of completion of the sequence of the looped motion. For example, if a sequence of a looped motion includes three arm rolls, and if it is determined that the user has successfully performed one arm roll, the user's progress of performing the arm roll sequence computed as a percentage of completion of the sequence of the looped motion, in this example is 33.33%.

In step 514, the user's progress of performing the sequence of the looped motion is displayed to the user, via the user interface. In one example, a progression tracking bar is graphically displayed to the user when the user completes a first iteration of a sequence of a looped motion. The user's progress of performing the sequence of the looped motion is indicated by filling a fraction of the progression tracking bar based on the user's successful completion of an iteration of the sequence of the looped motion, in which a filled fraction indicates the percentage of completion of the sequence of the looped motion. In another example, the visual intensity of an option depicting the sequence of the looped motion may be enhanced based on the user's progress of performing the sequence of the looped motion, in which the degree of visual intensity of the option indicates the percentage of completion of the looped motion. In another embodiment, a fraction or percentile representing the percentage of completion of the sequence of the looped motion is displayed.

In step 516, it is determined whether the user has completed the sequence of the looped motion based on the user's progress of performing the sequence of the looped motion. If it is determined that the user has not completed the sequence of the looped motion, then user motion data is captured by the sensors as discussed in step 504. For example, in an arm roll sequence comprising three arm rolls, it may be determined that the user has completed the sequence of the looped motion when the user has successfully completed the sequence of three arm rolls. If it is determined that the user has completed the sequence of the looped motion, then a selection of the option associated with the performed looped motion is automatically triggered in step 518 and the application will perform the function associated with the selected option. Examples of functions include playing a portion of a game by interacting with a user (e.g., display images in response to user input), show a video, receive user input, etc.

Figure 6:
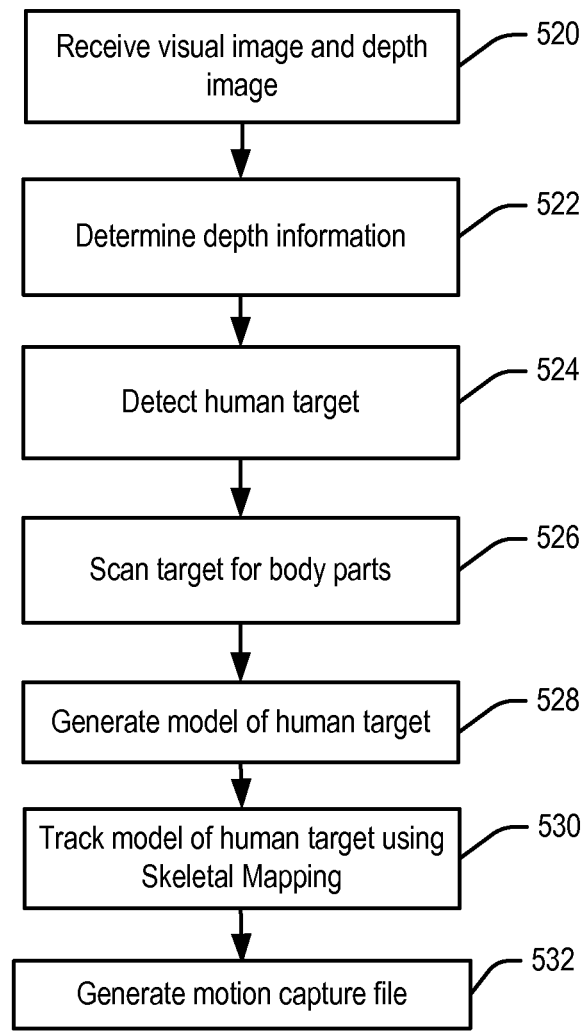
FIG. 6 is a flowchart describing one embodiment of a process for receiving user motion data from a sensor in the capture device.

FIGS. 6-10 are flow charts that provide more details of various steps of FIG. 5. FIG. 6 is a flowchart describing one embodiment of a process for receiving user motion data from a sensor in the capture device 20 (step 504 of FIG. 5). At step 520, processor 42 of the capture device 20 receives a visual image and depth image from the image capture component 32. In other examples, only a depth image is received at step 520. The depth image and visual image can be captured by any of the sensors in image capture component 32 or other suitable sensors as are known in the art. In one embodiment the depth image is captured separately from the visual image. In some implementations the depth image and visual image are captured at the same time while in others they are captured sequentially or at different times. In other embodiments the depth image is captured with the visual image or combined with the visual image as one image file so that each pixel has an R value, a G value, a B value and a Z value (representing distance).

At step 522, depth information corresponding to the visual image and depth image are determined. The visual image and depth image received at step 520 can be analyzed to determine depth values for one or more targets within the image. Capture device 20 may capture or observe a capture area that may include one or more targets.

At step 524 the capture device determines whether the depth image includes a human target. In one example, each target in the depth image may be flood filled and compared to a pattern to determine whether the depth image includes a human target. In one example, the edges of each target in the captured scene of the depth image may be determined. The depth image may include a two dimensional pixel area of the captured scene. Each pixel in the 2D pixel area may represent a depth value such as a length or distance for example as can be measured from the camera. The edges may be determined by comparing various depth values associated with for example adjacent or nearby pixels of the depth image. If the various depth values being compared are greater than a predetermined edge tolerance, the pixels may define an edge. The capture device may organize the calculated depth information including the depth image into Z layers or layers that may be perpendicular to a Z-axis extending from the camera along its line of sight to the viewer. The likely Z values of the Z layers may be flood filled based on the determined edges. For instance, the pixels associated with the determined edges and the pixels of the area within the determined edges may be associated with each other to define a target or an object in the capture area.

At step 526, the capture device scans the human target for one or more body parts. The human target can be scanned to provide measurements such as length, width or the like that are associated with one or more body parts of a user, such that an accurate model of the user may be generated based on these measurements. In one example, the human target is isolated and a bit mask is created to scan for the one or more body parts. The bit mask may be created for example by flood filling the human target such that the human target is separated from other targets or objects in the capture area elements.

At step 528 a model of the human target is generated based on the scan performed at step 526. The bit mask may be analyzed for the one or more body parts to generate a model such as a skeletal model, a mesh human model or the like of the human target. For example, measurement values determined by the scanned bit mask may be used to define one or more joints in the skeletal model. The bitmask may include values of the human target along an X, Y and Z-axis. The one or more joints may be used to define one or more bones that may correspond to a body part of the human.

According to one embodiment, to determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the shoulder position may be compared to a threshold shoulder value. For example, a distance between the two outer most Y values at the X value of the bitmask at the shoulder position may be compared to the threshold shoulder value of a typical distance between, for example, shoulders of a human. Thus, according to an example embodiment, the threshold shoulder value may be a typical width or range of widths associated with shoulders of a body model of a human.

In one embodiment, some body parts such as legs, feet, or the like may be calculated based on, for example, the location of other body parts. For example, as described above, the information such as the bits, pixels, or the like associated with the human target may be scanned to determine the locations of various body parts of the human target. Based on such locations, subsequent body parts such as legs, feet, or the like may then be calculated for the human target.

According to one embodiment, upon determining the values of, for example, a body part, a data structure may be created that may include measurement values such as length, width, or the like of the body part associated with the scan of the bitmask of the human target. In one embodiment, the data structure may include scan results averaged from a plurality depth images. For example, the capture device may capture a capture area in frames, each including a depth image. The depth image of each frame may be analyzed to determine whether a human target may be included as described above. If the depth image of a frame includes a human target, a bitmask of the human target of the depth image associated with the frame may be scanned for one or more body parts. The determined value of a body part for each frame may then be averaged such that the data structure may include average measurement values such as length, width, or the like of the body part associated with the scans of each frame. In one embodiment, the measurement values of the determined body parts may be adjusted such as scaled up, scaled down, or the like such that measurements values in the data structure more closely correspond to a typical model of a human body. Measurement values determined by the scanned bitmask may be used to define one or more joints in a skeletal model at step 528.

At step 530 the model created in step 528 is tracked using skeletal mapping. For example, the skeletal model of the user 18 may be adjusted and updated as the user moves in physical space in front of the camera within the field of view. Information from the capture device may be used to adjust the model so that the skeletal model accurately represents the user. In one example this is accomplished by one or more forces applied to one or more force receiving aspects of the skeletal model to adjust the skeletal model into a pose that more closely corresponds to the pose of the human target and physical space.

At step 532, motion is captured based on the skeletal mapping to generate a user motion capture file. In one embodiment, step 532 of capturing motion may include calculating the position, direction, acceleration and curvature of one or more body parts identified by the scan. The position of the body part is calculated in X, Y, Z space to create a three dimensional positional representation of the body part within the field of view of the camera. The direction of movement of the body part is calculated, dependent upon the position. The directional movement may have components in any one of or a combination of the X, Y, and Z directions. The curvature of the body part's movement in the X, Y, Z space is determined, for example, to represent non-linear movement within the capture area by the body part. The velocity, acceleration and curvature calculations are not dependent upon the direction. It is to be appreciated that the use of X, Y, Z Cartesian mapping is provided only as an example. In other embodiments, different coordinate mapping systems can be used to calculate movement, velocity and acceleration. A spherical coordinate mapping, for example, may be useful when examining the movement of body parts which naturally rotate around joints.

Once all body parts in the scan have been analyzed, the user motion capture file generated in step 532 may be updated for the target. In one example, the user motion capture file is generated in real time based on information associated with the tracked model. For example, in one embodiment the motion capture file may include the vectors including X, Y, and Z values that define the joints and bones of the model as it is being tracked at various points in time. As described above, the model being tracked may be adjusted based on user motions at various points in time and a motion capture file of the model for the motion may be generated and stored. The user motion capture file may capture the tracked model during natural movement by the user interacting with the target recognition analysis and tracking system. For example, the user motion capture file may be generated such that the user motion capture file may naturally capture any movement or motion by the user during interaction with the target recognition analysis and tracking system. The user motion capture file may include frames corresponding to, for example, a snapshot of the motion of the user at different points in time. Upon capturing the tracked model, information associated with the model including any movements or adjustment applied thereto at a particular point in time may be rendered in a frame of the user motion capture file. The information in the frame may include for example the vectors including the X, Y, and Z values that define the joints and bones of the tracked model and a time stamp that may be indicative of a point in time in which for example the user performed the movement corresponding to the pose of the tracked model.

In one embodiment, steps 520-532 are performed by capture device 20. Furthermore, although steps 520-532 are described as being performed by capture device 20, various ones of these steps may be performed by other components, such as by computing device 12. For example, the capture device 20 may provide the visual and/or depth images to the computing device 12 which will in turn, determine depth information, detect the human target, scan the target, generate and track the model and capture motion of the human target.

Figure 7:
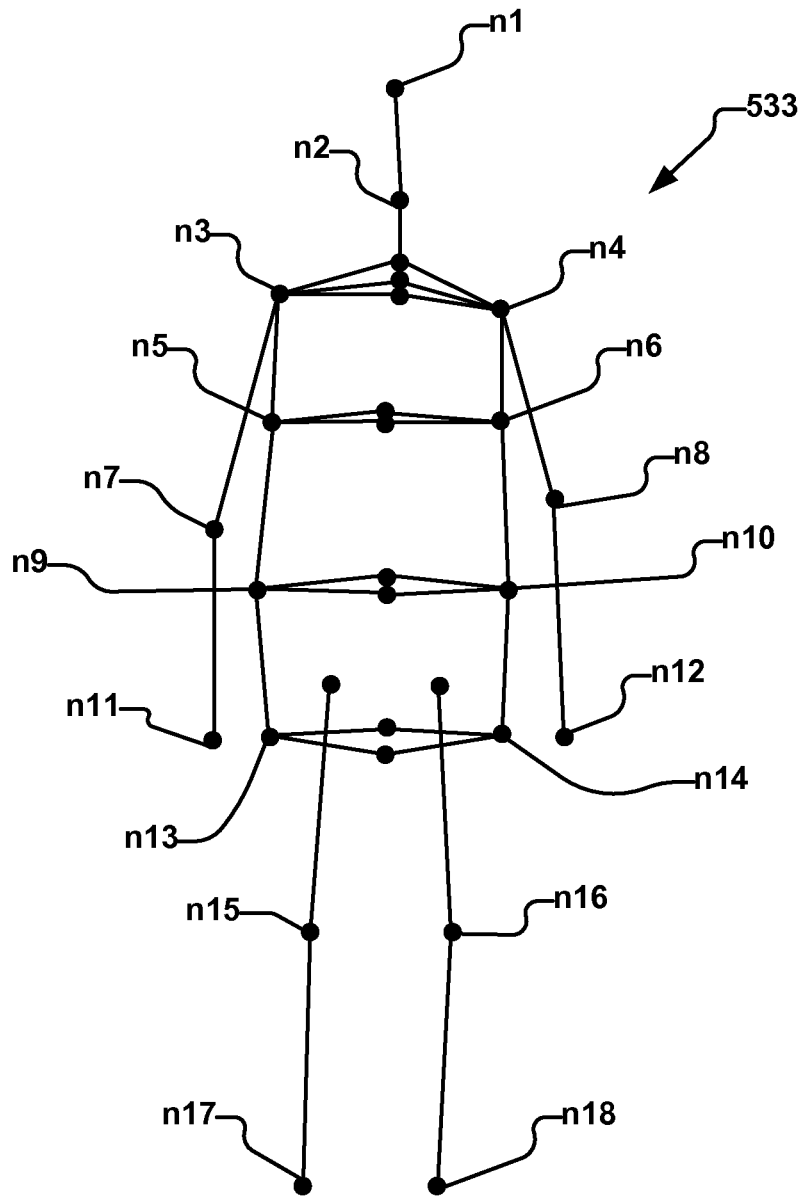
FIG. 7 illustrates an example of a skeletal model or mapping representing a scanned human target.

FIG. 7 illustrates an example of a skeletal model or mapping 533 representing a scanned human target that is used with the process of FIG. 6. According to one embodiment, the skeletal model 540 may include one or more data structures that may represent a human target as a three-dimensional model. Each body part may be characterized as a mathematical vector defining joints and bones of the skeletal model 533.

Skeletal model 533 includes joints n1-n18. Each of the joints n1-n18 may enable one or more body parts defined there between to move relative to one or more other body parts. A model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other or relative to each other. For example, the bone defined between the joints n7 and n11 corresponds to a forearm that may be moved independent of, for example, the bone defined between joints n15 and n17 that corresponds to a calf. It is to be understood that some bones may correspond to anatomical bones in a human target and/or some bones may not have corresponding anatomical bones in the human target.

The bones and joints may collectively make up a skeletal model, which may be a constituent element of the model. An axial roll angle may be used to define a rotational orientation of a limb relative to its parent limb and/or the torso. For example, if a skeletal model is illustrating an axial rotation of an arm, a roll joint may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle. The system can track the motion of the joints over time to identify motion of the user as part of the process of recognizing looped motion.

Figure 8:
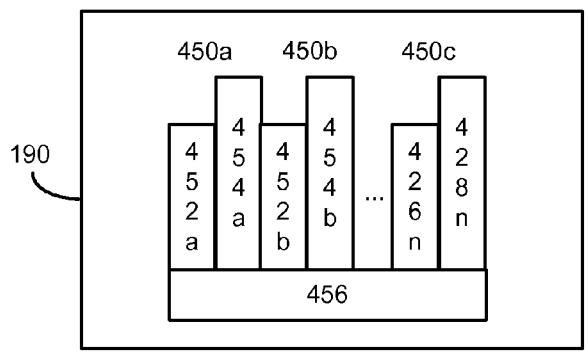
FIG. 8 provides further details of an exemplary embodiment of the gesture recognition engine shown in FIG. 2.

FIG. 8 provides further details of an exemplary embodiment of the gesture recognition engine 190 shown in FIG. 2. In one embodiment, the gesture recognition engine 190 can be used to recognize looped motion. As shown, the gesture recognition engine 190 may comprise at least one filter 450 to determine a gesture or gestures such as a looped motion. A filter 450 comprises parameters defining a gesture 452 (hereinafter referred to as a "gesture") along with metadata 454 for that gesture. A filter may comprise code and associated data that can recognize gestures or otherwise process depth, RGB, or skeletal data. For instance, an arm roll which comprises motion of one or both hands from behind the rear of the body to past the front of the body, may be implemented as a gesture 452 comprising information representing the movement of one or both of the hands of the user from behind the rear of the body to past the front of the body, as that movement would be captured by the depth camera. Parameters 454 may then be set for that gesture 452. Where the gesture 452 is an arm roll for example, a parameter 454 may be a threshold velocity that the hands have to reach, a distance the hands must travel (either absolute, or relative to the size of the user as a whole), and a confidence rating by the recognition engine that the gesture occurred. These parameters 454 for the gesture 452 may vary between applications, between contexts of a single application, or within one context of one application over time. Gesture parameters may include threshold angles (e.g., hip-thigh angle, forearm-bicep angle, etc.), a number of periods where motion occurs or does not occur, a threshold period, threshold position (starting, ending), direction of movement, velocity, acceleration, coordination of movement, etc.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the capture area, and the rate of change of an aspect of the user. Outputs from a filter may comprise things such as the confidence that a given gesture is being made, the speed at which a gesture motion is made, and a time at which a gesture motion is made.

The gesture recognition engine 190 may have a base recognition engine 456 that provides functionality to a gesture filter 450. In an embodiment, the functionality that the base recognition engine 456 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 450 are loaded and implemented on top of the base recognition engine 456 and can utilize services provided by the engine 456 to all filters 450. In an embodiment, the base recognition engine 456 processes received data to determine whether it meets the requirements of any filter 450. Since these provided services, such as parsing the input, are provided once by the base recognition engine 456 rather than by each filter 450, such a service need only be processed once in a period of time as opposed to once per filter 450 for that period, so the processing required to determine gestures is reduced.

An application may use the filters 450 provided by the recognition engine 190, or it may provide its own filter 450, which plugs in to the base recognition engine 456. In an embodiment, all filters 450 have a common interface to enable this plug-in characteristic. Further, all filters 450 may utilize parameters 454, so a single gesture tool as described below may be used to debug and tune the entire filter system. These parameters 454 may be tuned for an application or a context of an application by a gesture tool.

There are a variety of outputs that may be associated with the gesture. In one example, there may be a baseline "yes or no" as to whether a gesture is occurring. In another example, there may be a confidence level, which corresponds to the likelihood that the user's tracked movement corresponds to the gesture. This could be a linear scale that ranges over floating point numbers between 0 and 1, inclusive. Where an application receiving this gesture information cannot accept false-positives as input, it may use only those recognized gestures that have a high confidence level, such as at least 0.95, for example. Where an application must recognize every instance of the gesture, even at the cost of false-positives, it may use gestures that have at least a much lower confidence level, such as those merely greater than 0.2, for example. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 410*a*, and on the same side of the head 422 as the throwing arm 402*a*-410*a*. It may not be necessary to define all bounds of a volume, such as with this throwing gesture, where an outer bound away from the body is left undefined, and the volume extends out indefinitely, or to the edge of capture area that is being monitored.

In addition, gestures may stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

FIG. 9 is a flowchart describing one embodiment of a process for determining whether the user is performing a looped motion (e.g., performing step 506 of FIG. 5). FIG. 9 describes a rule based approach for applying one or more gesture filters by the gesture recognition engine 190 to determine whether the user's motion matches a particular gesture. In one embodiment, the gestures may correspond to one or more looped motions performed by the user. It will be appreciated that the process of FIG. 9 may be performed multiple times to detect multiple gestures in the active gesture set although detection of a single gesture is described in the particular example. The described process may be performed in parallel or in sequence for multiple active gestures.

At step 534, the gesture recognition engine accesses the skeletal tracking data for a particular target to begin determining whether that target has performed a selected gesture or a looped motion. The skeletal tracking data can be accessed from a user motion capture file, as discussed in FIG. 6. At step 536, the gesture recognition engine filters the skeletal tracking data for one or more predetermined body parts pertinent to the selected gesture or the looped motion as identified in the selected gesture filter. Step 536 can include accessing only that data which is pertinent to the selected gesture, or accessing all skeletal tracking data for the target and ignoring or discarding information not pertinent to the selected gesture.

For example, an arm roll filter may indicate that only a human target's hand is pertinent to the selected gesture or looped motion such that data pertaining to other body parts can be ignored. Such a technique can increase the performance of the gesture recognition engine by limiting processing to that information predetermined to be salient to the selected gesture.

At step 538, the gesture recognition engine filters the skeletal tracking data for predetermined axial movements. For example, the selected gesture's filter may specify that only movements along a subset of axes are relevant.

At step 540, the gesture recognition engine accesses a rule j specified in the gesture filter. In the first iteration through the process of FIG. 9, j is equal to 1. A gesture or looped motion may include a plurality of parameters that need to be satisfied in order for the gesture to be recognized. Each one of these parameters can be specified in a separate rule, although multiple components can be included in a single rule. A rule may specify a threshold distance, position, direction, curvature, velocity and/or acceleration, among other parameters, that a target's body part must meet in order for the gesture to be satisfied. A rule may apply to one body part or multiple body parts. Moreover, a rule may specify a single parameter such as position or multiple parameters such as position, direction, distance, curvature, velocity and acceleration.

At step 542, the gesture recognition engine compares the skeletal tracking data filtered at steps 536 and 538 with the specified parameter(s) of the rule to determine whether the rule is satisfied. For example, the gesture recognition engine may determine whether a hand's starting position was within a threshold distance of a starting position parameter. The rule may further specify and the engine determine whether the hand moved in a specified direction, moved a threshold distance from the starting position in the specified direction; moved within a threshold curvature along a specified axis, moved at or above a specified velocity; reached or exceeded a specified acceleration. If the engine determines that the skeletal tracking information does not meet the parameters specified in the filter rule, the engine returns a fail or a gesture filter not matched response in step 544. In one embodiment, a response indicating that the user motion data does not match the looped motion may be returned to application 202 executing on computing device 12.

At step 546 the gesture recognition engine determines whether the gesture filter specifies additional rules that must be met for the gesture to be completed. If additional rules are included in the filter, j is incremented by one and the process returns to step 540 where the next rule is accessed. If there are no additional rules, the gesture recognition engine returns an indication that the gesture filter has been matched at step 550. In one embodiment, a response indicating that the user motion data matches the looped motion may be returned to application 202 executing on computing device 12.

Steps 544 and 550 of FIG. 9 return a simple pass/fail response for the gesture being analyzed. In other examples, rather than return a simple pass/fail response, FIG. 9 will return a confidence level that the gesture's filter was satisfied. For each rule in the filter, an amount by which the target's movement meets or does not meet a specified parameter is determined. Based on an aggregation of these amounts, the recognition engine returns a confidence level that the gesture was indeed performed by the target.

Figure 10:
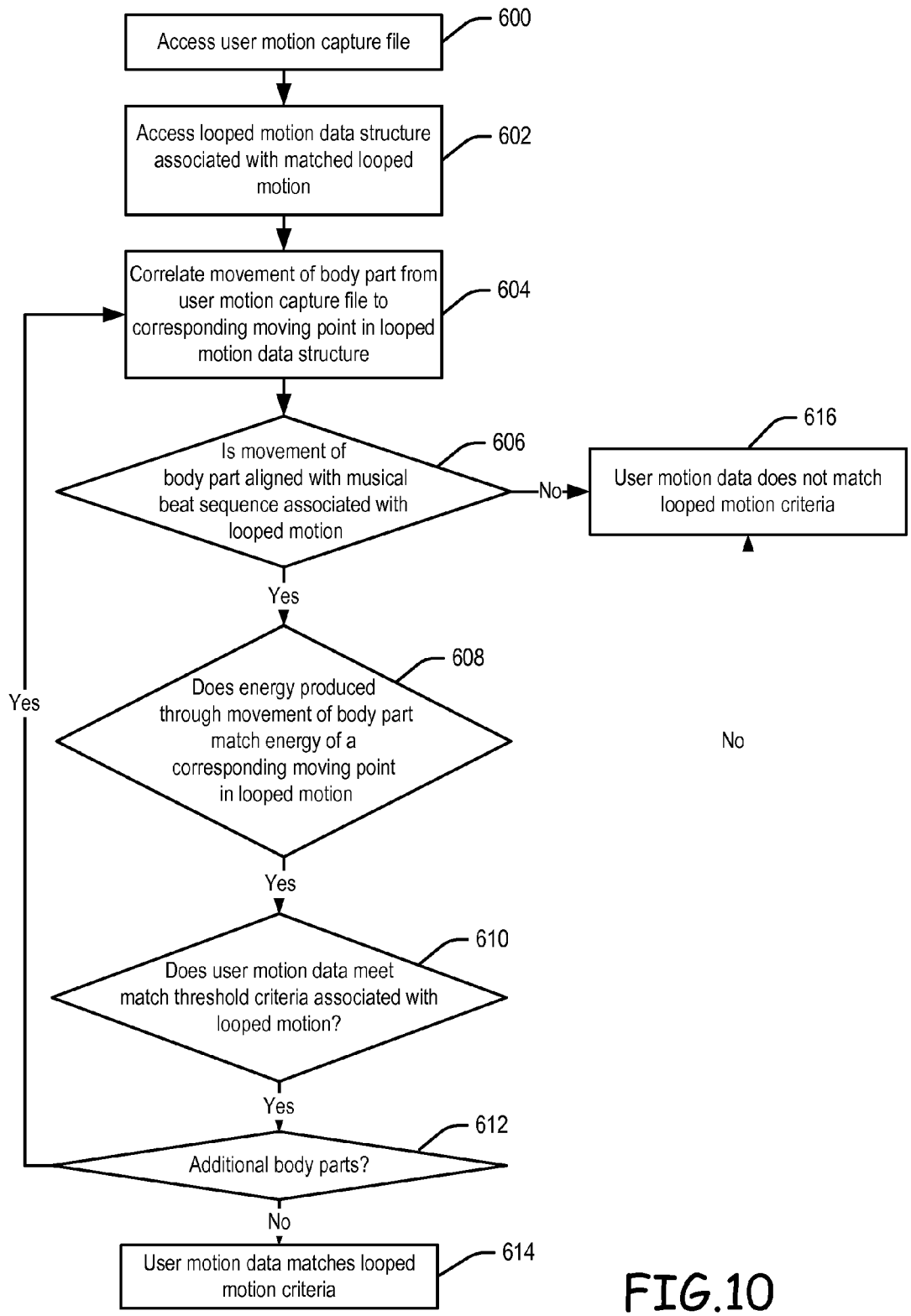
FIG. 10 is a flowchart describing one embodiment of a process for determining if the user motion data matches one or more looped motion criteria.

FIG. 10 is a flowchart describing one embodiment of a process for determining if the user motion data matches one or more looped motion criteria (step 510 of FIG. 5). In step 600, a user motion capture file comprising user motion data captured from one or more sensors in the capture device 20 is accessed. In step 602, a looped motion data structure associated with a matched looped motion (obtained in step 506 of FIG. 5) is accessed. In one embodiment, the looped motion data structure may include one or more moving points corresponding to the movement of specific body parts involved in performing the looped motion and looped motion criteria associated with each moving point. In one embodiment, the looped motion criteria may include a musical beat sequence associated with performing the sequence of the looped motion, the energy produced through a movement of a body part involved in performing the sequence of the looped motion and a match threshold value associated with the sequence of the looped motion. Other criteria can also be used.

In step 604, the movement of a body part from the user motion capture file is correlated to a corresponding moving point in the looped motion data structure associated with the matched looped motion. In step 606, it is determined whether the movement of a body part in the user motion data is aligned with the musical beat sequence associated with the looped motion. In one embodiment, each moving point in the looped motion may be associated with a specific musical beat sequence. An alignment of a movement of a body part to a musical beat sequence may be established by determining if the movement of the body part occurs at the same moment in time of occurrence of the musical beat sequence, in one example. If it is determined that the movement of the body part is not aligned with the musical beat sequence associated with the looped motion, then the system returns a musical beat not matched response in step 616, indicating that the user motion data does not match the looped motion criteria.

In step 608, it is determined whether the energy produced through the movement of a body part in the user motion data matches the energy of a corresponding moving point in the looped motion. In one example, the energy is determined based on the kinetic energy produced by the user through the movement of a body part involved in performing the sequence of the looped motion. The kinetic energy may be derived as a function of the mass of the body part and the speed of movement of the body part. As will be appreciated, the kinetic energy equals one half times the mass of an object times the square of the speed of the object. For example, the kinetic energy produced through the movement of a body part equals 40 joules if the body part has a mass of 5.0 pounds and can move at a speed of 1.0 mile/second. In one embodiment, the kinetic energy produced through the movement of a body part by the user may be compared to a range of kinetic energy values associated with a corresponding moving point in the looped motion to determine if the if the energy of the movement of a body part in the user motion data matches the energy of a corresponding moving point in the looped motion. For example, if it is determined that the typical range of kinetic energy values associated with a particular moving point in the looped motion is between the range of 40-50 joules, the energy of the movement of a body part by the user matches the energy associated with the moving point, if the kinetic energy produced through the movement of a body part is determined to be, say for example, 43 joules. Mass of a body part can be estimated from the depth information or it can be part of the user's profile information.

At step 608, if it is determined that the energy of the movement of a body part in the user motion data does not match the energy associated with the corresponding moving point in the looped motion, then the system returns an energy not matched response in step 616, indicating that the user motion data does not match the looped motion criteria.

In step 610, a check is made to determine if the movement of the body part in the user motion data matches a match threshold value associated with the looped motion. In one embodiment, the match threshold value is a measure of correlation of the user motion data with the looped motion. The match threshold value associated with a specific looped motion may be defined as a pre-defined match percentage, in one example. For example, if the pre-defined match percentage associated with a specific looped motion is 80%, and if the movement of 8 body parts by the user have matched the musical beat sequence and the energy of 8 corresponding moving points out of 10 moving points associated with the looped motion, then it is determined that the user motion data meets the match threshold value associated with the looped motion, in this example.

In step 612, a check is made to determine if there are additional body parts in the user motion data to be analyzed. If there are additional body parts to be analyzed, the movement of the next body part is analyzed as described in step 604. If it is determined that there are no additional body parts to be analyzed and the user motion data meets the match threshold value associated with the looped motion, a response indicating that the user motion data matches the looped motion criteria is returned in step 614.

Figure 11B:
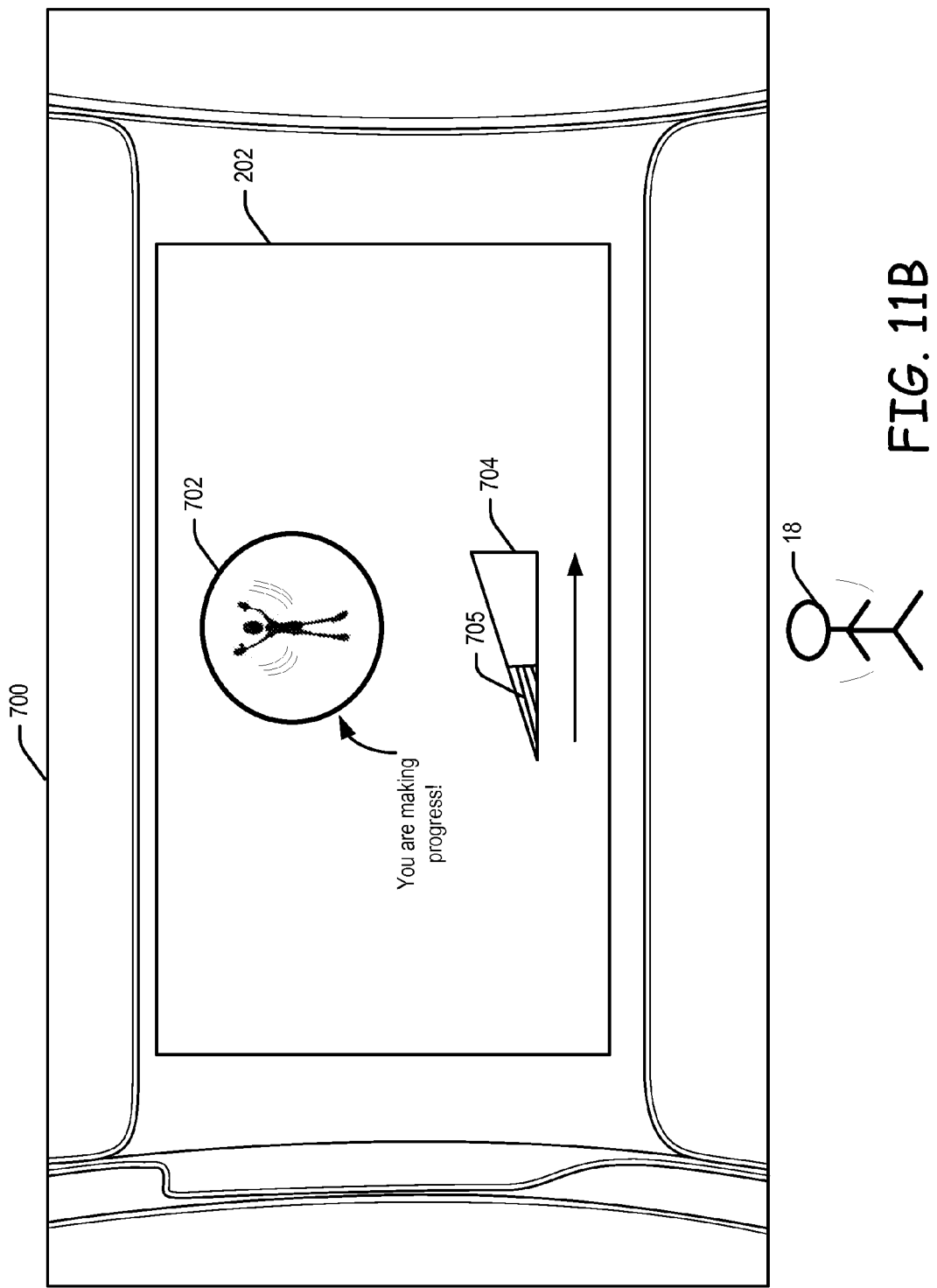

FIGS. 11A-11F illustrate various user interface screens depicting a user's interaction with an application executing on a computing device, in accordance with one embodiment of the present invention. FIG. 11A illustrates a user interface 700 in computing device 12 that displays an option 702 to a user 18 interacting with an application 202 in the computing device 12. In the illustrated example, option 702 displays a sequence of a looped motion, such as a jumping jack sequence, in which the sequence of the looped motion is performed by an on-screen representation of a character. As further illustrated, the user is prompted with a text message "Mimic the movement of the silhouette to start the game!" that instructs the user to perform the sequence of the looped motion displayed by the on-screen representation of the character. In one example, the user would need to properly perform three jumping jacks to start the game.

Figure 11C:
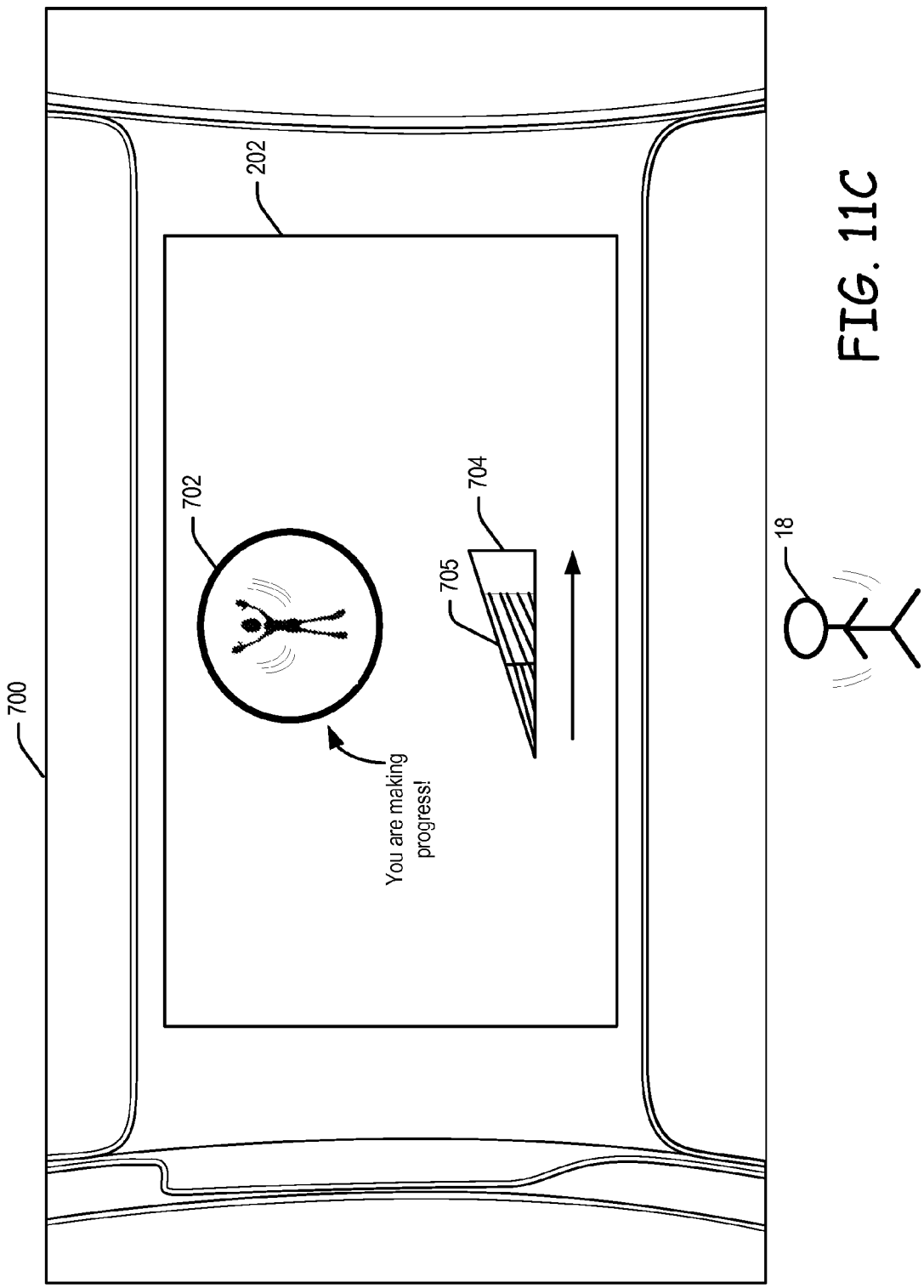

FIGS. 11B and 11C illustrate a user's progress towards performing a sequence of a looped motion. As illustrated, the user's progress of performing the sequence of the "Jumping Jack" looped motion displayed via option 702 is depicted by a progression tracking bar 704. A filled fraction 705 of the progression tracking bar 704 indicates that the user has successfully completed one or more iterations of the sequence of the looped motion. It may also be noted that the degree of visual intensity of the option 702 increases based on the user's progress of performing the sequence of the looped motion. As further illustrated, the user may be prompted with a text message, "You are making progress!" indicating the user's progress towards performing the sequence of the looped motion.

FIGS. 11D and 11E illustrate the manner in which a user may be guided to perform a sequence of a looped motion. FIG. 11D illustrates guided text provided to the user when the user does not perform the looped motion depicted by option 702 accurately. In one example, the user may be provided with guided text, such as, "Observe the circled area to perform the motion accurately" that describes the manner in which the user may perform the looped motion. Similarly, FIG. 11E illustrates guided text that is provided to the user when the user does not perform the looped motion depicted by the option 702 in accordance with one or more looped motion criteria associated with the looped motion. For example, the user may be provided with guided text, such as, "Move to the musical beat and put in more energy into the motion!" that describes the manner in which the user may perform the looped motion. It may also be observed that the filled fraction 705 of the progression bar 704 and the visual intensity of the option 702 decreases when the user's motion does not match the looped motion or when the user's motion does not match one or more looped motion criteria.

FIG. 11F is an illustration of the completion of the looped motion sequence by the user. As may be observed, the progression bar 704 is completely filled when the user successfully completes the sequence of the looped motion. The visual intensity of the option 702 also reaches a maximum intensity, indicating the automatic selection of the option 702 by the user. As further illustrated, a text message such as, "You have successfully selected this option!" may also be displayed to the user.

Figure 12:
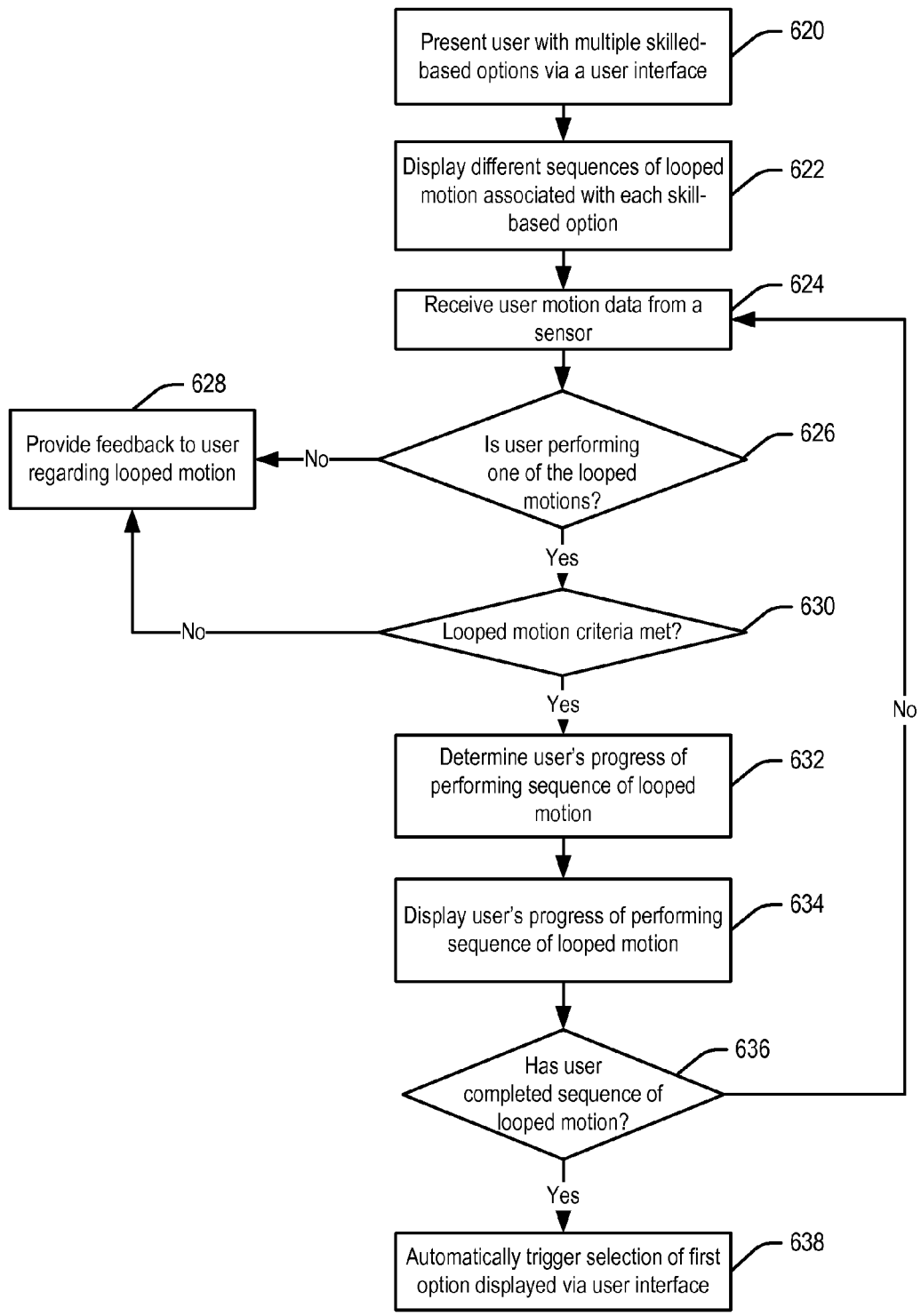
FIG. 12 is a flowchart describing another embodiment of a process for allowing a user to make a selection using a looped motion.

FIG. 12 is a flowchart describing another embodiment of a process for allowing a user to make a selection using a looped motion. In one embodiment, the steps of FIG. 12 may be performed by software modules in the gesture recognition engine 190, the application control logic 200, the loop recognition engine 194 and/or the display module 196. In step 620, the user is presented with multiple skilled-based options via a user interface in computing device 12. In step 622, different sequences of looped motion associated with each skill-based option are displayed to the user. The different sequences of looped motion each have different skill levels to performing the associated sequence of the looped motion. In one example, the different skill levels may include a beginner level (e.g., easy), an intermediate level (e.g., more difficult) and an advanced level (e.g., most difficult).

In step 624, user motion data is received from a sensor. As discussed in FIG. 5, one or more sensors in the capture device 20 may receive information about the user's motion. In step 626 a check is made to determine if the user is performing one of the looped motions depicted by the skilled-based options, based on the received user motion data. Step 626 may include determining if the user motion data matches one or more looped motions defined in the gesture recognition engine 190. If it is determined that the user is not performing any one of the looped motions depicted by the skill-based options, then feedback regarding the looped motion is provided to the user, in step 628. If it is determined that the user is performing one of the looped motions, then in step 630, it is determined whether the user motion data matches one or more looped motion criteria for the performed looped motion, as discussed in FIG. 5. If it is determined that the user is performing one of the looped motions, but not in accordance with one or more looped motion criteria, then feedback regarding the manner in which the looped motion may be performed is provided to the user, in step 628.

In steps 632 and 634, the user's progress of performing the sequence of the looped motion depicted by the skill-based option is determined and displayed as discussed in FIG. 2. In step 636, a check is made to determine if the user has completed the sequence of the looped motion. If it is determined that the user has not completed the sequence of the looped motion, then user motion data is captured by the sensors as discussed in step 624. If it is determined that the user has successfully completed the sequence of the looped motion, then a selection of the skill-based option displayed via the user interface that is associated with the performed looped motion is automatically triggered in step 638.

Figure 13A:
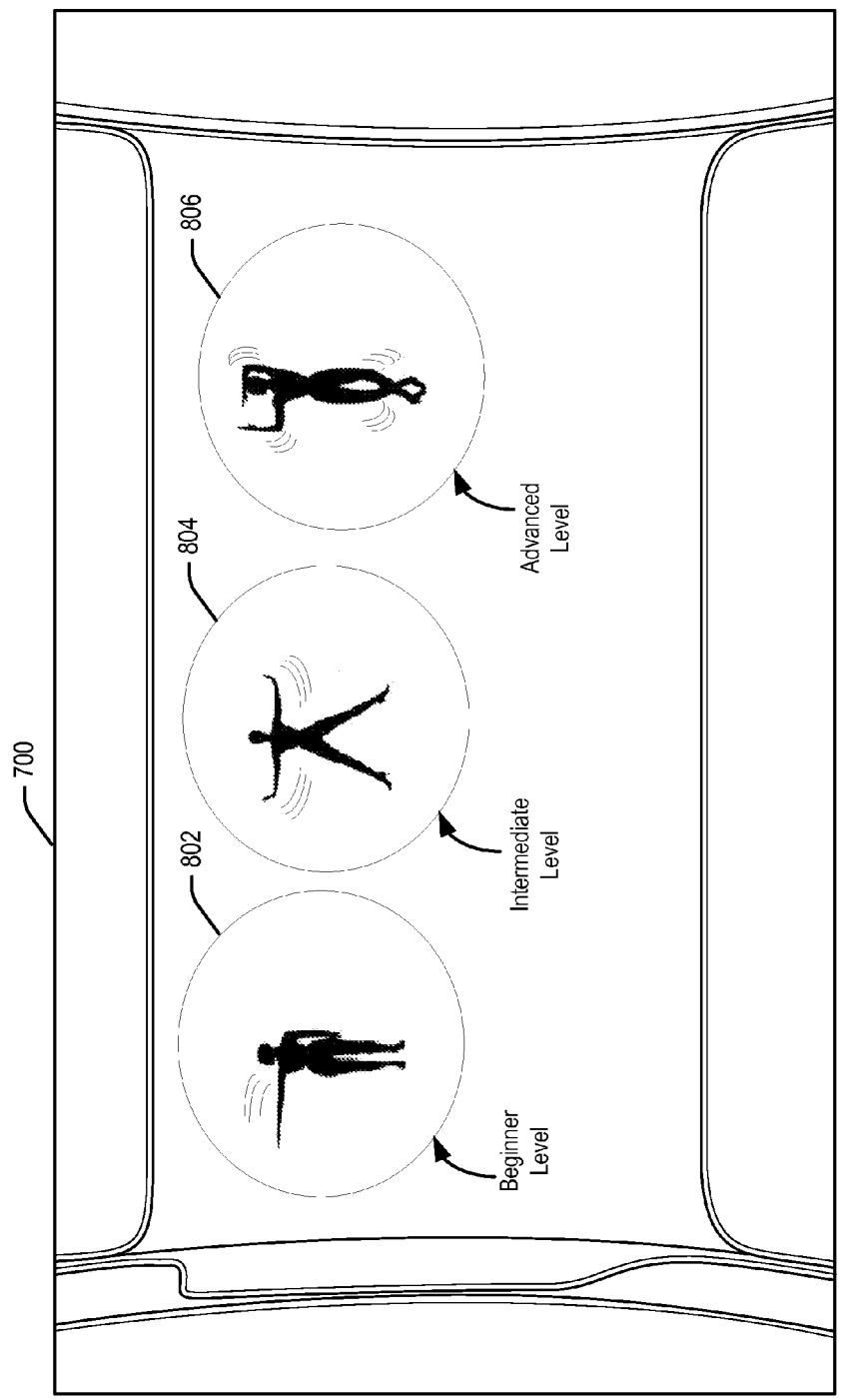
FIGS. 13A-13C illustrate various user interface screens depicting a user's interaction with an application executing on a computing device, in accordance with another embodiment of the present invention.
Figure 13B:
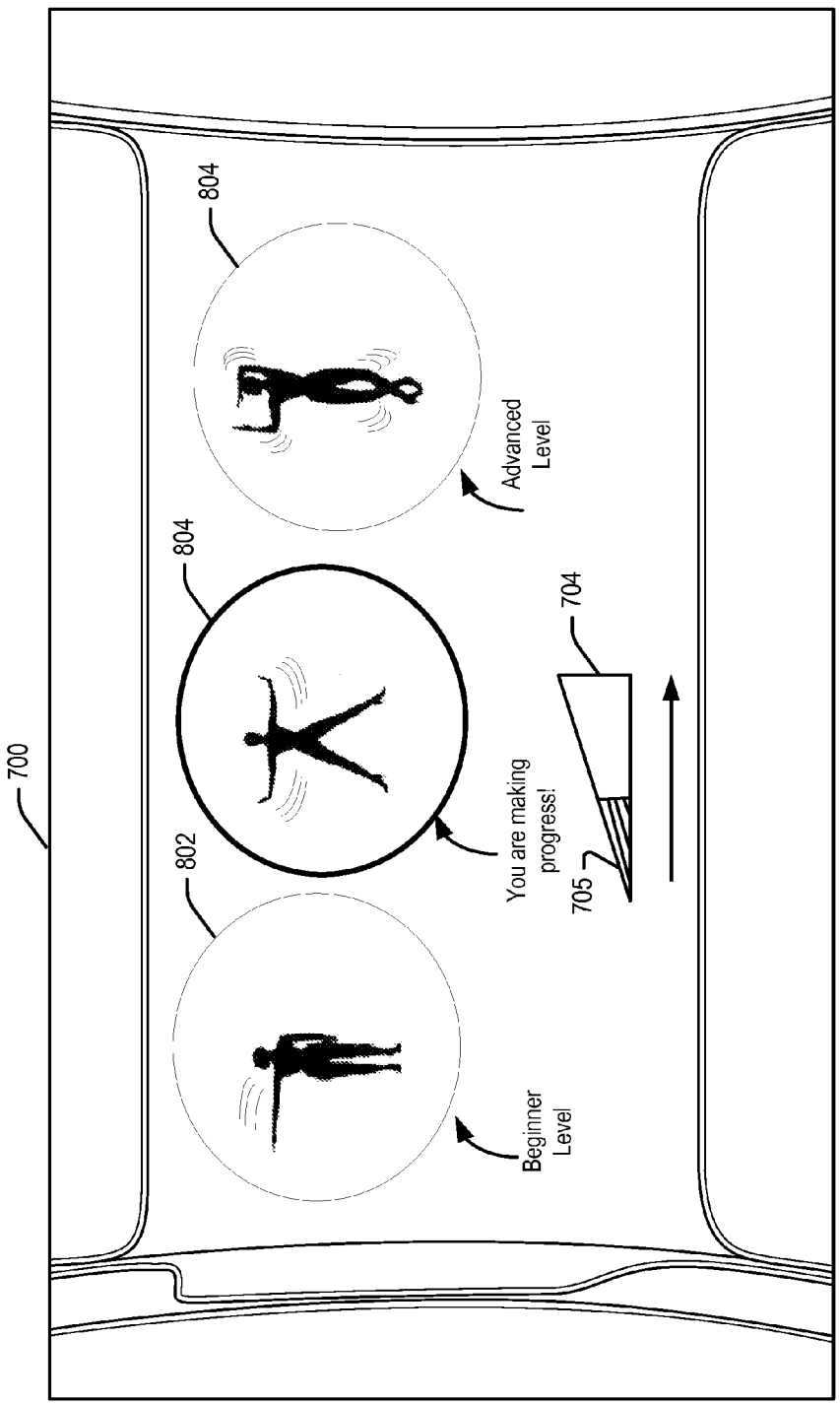
Figure 13C:
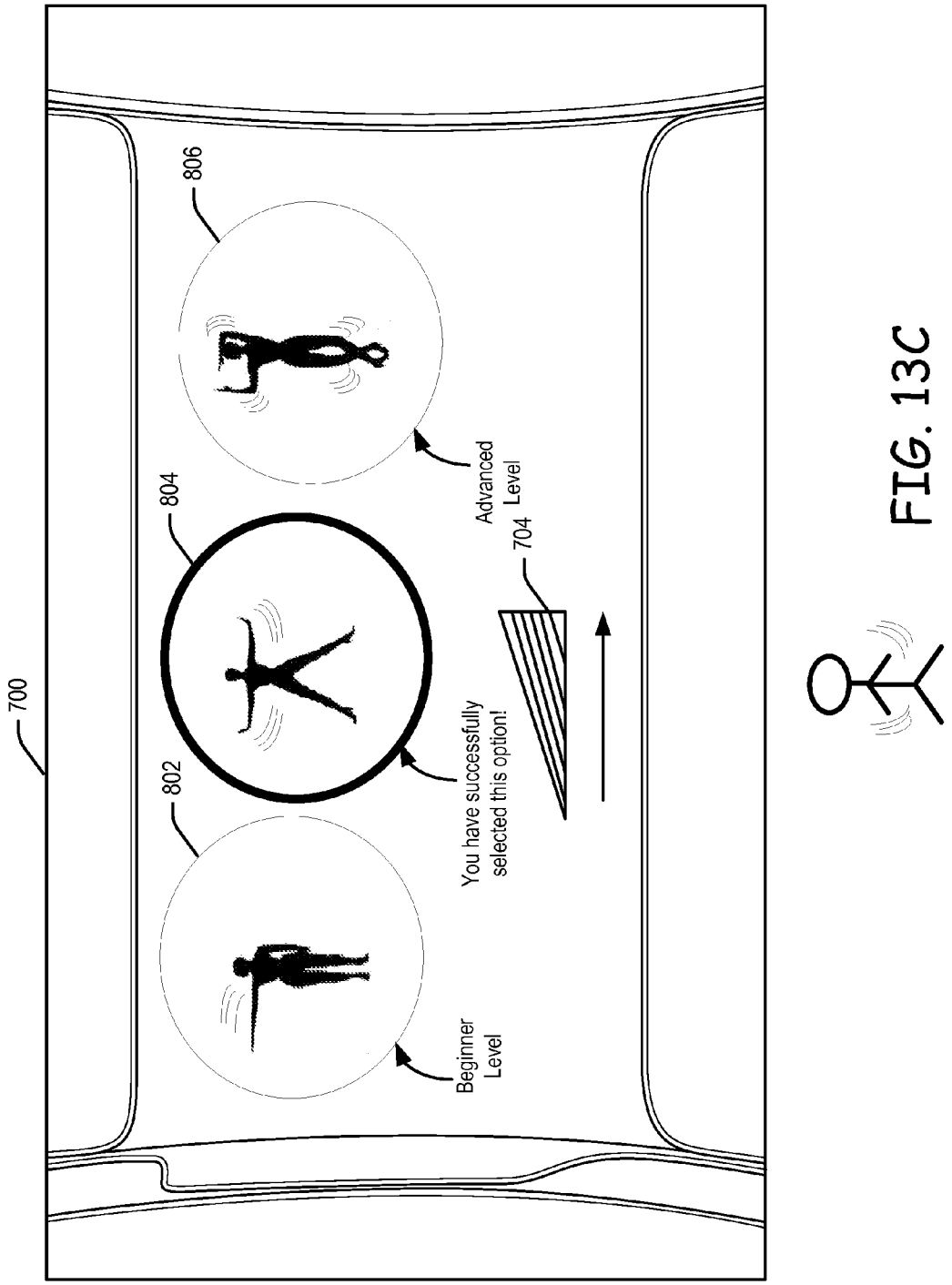

FIGS. 13A-13C illustrate various user interface screens depicting a user's interaction with an application executing on a computing device, in accordance with another embodiment of the present invention. FIG. 13A illustrates a user interface 700 that displays one or more skill-based options 802, 804 and 806 to a user 18 interacting with an application 202 in the computing device 12. As illustrated, the skill-based options 802, 804 and 806 display different sequences of looped motion having different skill levels associated with performing a sequence of a looped motion. As further illustrated, and in one example, the skill-levels may include a "Beginner level", an "Intermediate Level" and an "Advanced Level".

FIG. 13B illustrates a user's progress towards performing a sequence of a looped motion depicted by one of the skill-based options shown in FIG. 13A. Once it is determined that the user is performing a looped motion depicted by one of the skill-based options 802, 804 and 806, the user's progress of performing the sequence of the looped motion is tracked. As illustrated, the filled fraction 705 of the progression tracking bar 704 indicates that the user has successfully completed one or more iterations of the sequence of the looped motion depicted by the "Intermediate" skill-based option 804. It may also be noted that the visual intensity of the option 804 increases based on the user's progress of performing the looped motion sequence. As further illustrated, the user may be prompted with a text message, "You are making progress!" indicating the user's progress towards performing the sequence of the looped motion.

FIG. 13C is an illustration of the completion of the looped motion sequence depicted by a skill-based option, by the user. As may be observed, the progression bar 704 is completely filled when the user successfully completes the sequence of the looped motion. The visual intensity of the option 804 also reaches a maximum intensity, indicating the automatic selection of the option 804 by the user. As further illustrated, a text message such as, "You have successfully selected this option!" may also be displayed to the user.

Figure 14:
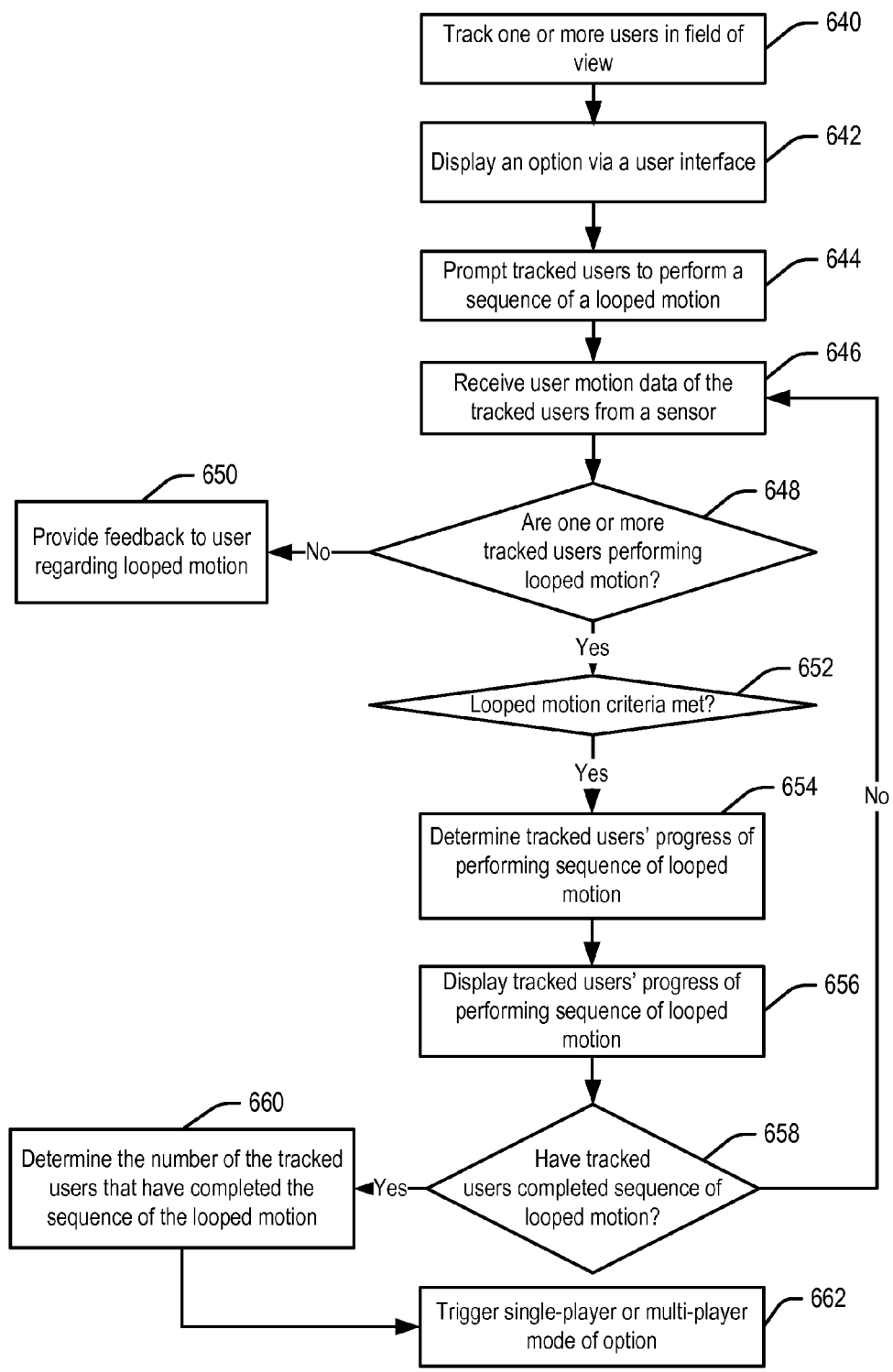
FIG. 14 is a flowchart describing yet another embodiment of a process for performing the operations of the disclosed technology.

FIG. 14 is a flowchart describing another embodiment of a process for performing the operations of the disclosed technology. As discussed in FIG. 5, an option depicted in an application is automatically selected when a user successfully performs a looped motion sequence depicted by the option. In accordance with another embodiment of the disclosed technology, a specific mode such as a "single-player" mode or a "multi-player" mode associated with an option may automatically be triggered depending on the number of users who simultaneously interact with the application. In one embodiment, the steps of FIG. 14 may be performed by software modules in the gesture recognition engine 190, the application control logic 200, the loop recognition engine 194 and/or the display module 196.

In step 640, one or more users are tracked in a field of view of the capture device. As discussed in FIG. 6, one or more sensors in capture device 20 may be used to track one or more users within a field of view of the capture device. In step 642, an option is displayed to the user via a user interface in the computing device. In step 644, the tracked users are prompted to perform the sequence of the looped motion displayed by the option as discussed in FIG. 5.

In step 646, user motion data of the one or more tracked users is received from a sensor. In 648, a check is made to determine if the one or more tracked users are performing the looped motion depicted by the option. If it is determined that the one or more tracked users are not performing the looped motion depicted by the option, then feedback regarding the looped motion is provided to the tracked users, in step 650. In step 652, a check is made to determine if the user motion data of the one or more tracked users matches one or more looped motion criteria, as discussed in FIG. 5. If it is determined that the one or more tracked users are performing the looped motion, but not in accordance with one or more looped motion criteria, then feedback regarding the manner in which the looped motion should be performed is provided to the one or more tracked users, in step 650. In steps 654 and 656, the one or more tracked user's progress of performing the sequence of the looped motion depicted by the option is determined and displayed as discussed in FIG. 5. In step 658, a check is made to determine if the one or more tracked users have completed the sequence of the looped motion. If it is determined that the one or more tracked users have not completed the sequence of the looped motion, then user motion data is captured by the sensors as discussed in step 646. If it is determined that the one or more tracked users have successfully completed the sequence of the looped motion, then in step 660, the number of the one or more tracked users that have completed the sequence of the looped motion, is determined. In step 662, a selection of a single-player mode or a multi-player mode for the option is automatically triggered, in response to determining the number of the one or more tracked users that have completed performing the sequence of the looped motion.

FIGS. 15A and 15B illustrate various user interface screens depicting a user's interaction with an application executing on a computing device, in accordance with yet another embodiment of the present invention. FIG. 15A illustrates three users 18, 19 and 21 interacting with an application 202 in computing device 12. The user interface 700 displays an option 702 which depicts a sequence of a looped motion to users 18, 19 and 21. FIG. 15A also illustrates a progression tracking bar 704 that displays the users' progress of performing the sequence of the looped motion. The filled fraction 705 of the progression tracking bar 704 indicates that the users' have successfully completed one or more iterations of the sequence of the looped motion.

FIG. 15B is an illustration of the completion of the looped motion sequence by the tracked users. As may be observed, the progression bar 704 is completely filled when the tracked users successfully complete the sequence of the looped motion. The visual intensity of the option 702 also reaches a maximum intensity, indicating the automatic selection of the option 702 by the users. As may be observed, a selection of a "multi-player" mode of option 702 is automatically triggered since more than one user simultaneously interacts with application 202. As further illustrated, a text message such as, "Multi-player mode with 3 players selected!" may also be displayed to the users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for performing user selection of an option, comprising:
    displaying an option and a sequence of a looped motion associated with the option by a user interface of a computing device, the computing device including one or more processors and memory;
    receiving user motion data from a sensor connected to the computing device;
    determining if the user is performing the looped motion based on the received user motion data;
    if the user is performing the looped motion, determining if the user motion data matches one or more looped motion criteria by determining if energy produced through a movement of a body part in the user motion data matches energy of a corresponding moving point in the looped motion, wherein the energy produced through the movement of the body part is derived as a function of a mass of the body part and a speed of the movement of the body part;

determining the user's progress of performing the sequence of the looped motion based on the user motion data matching the one or more looped motion criteria;

displaying the user's progress of performing the sequence of the looped motion;

determining that the user has completed the sequence of looped motion based on the user's progress of performing the sequence of the looped motion; and automatically triggering a selection of the option displayed in response to determining that the user has completed the sequence of looped motion and performing a function associated with the selection of the option.

2. The method of claim 1, wherein determining if the user motion data matches the one or more looped motion criteria further comprises:

determining if a movement of a body part in the user motion data is aligned with a musical beat sequence associated with the looped motion.

3. The method of claim 1, wherein determining if the user motion data matches the one or more looped motion criteria further comprises:

determining if a movement of a body part in the user motion data matches a match threshold value associated with the looped motion, wherein the match threshold value is a measure of correlation of the user motion data with the looped motion.

4. The method of claim 1, wherein:

the looped motion comprises a repeatable motion performed by the user, the repeatable motion comprising at least one of an exercise routine or a dance move in an application executing in the computing device.

5. The method of claim 1, wherein displaying the user's progress of performing the sequence of the looped motion further comprises:

displaying a progression tracking bar to the user, wherein a filled fraction of the progression tracking bar indicates a percentage of completion of the sequence of the looped motion.

6. The method of claim 1, wherein:

the option depicts an on-screen representation of a character performing the sequence of the looped motion to the user.

7. The method of claim 1, wherein prompting a user to perform a sequence of a looped motion further comprises:

presenting the user with guided text instructing the user to perform the sequence of the looped motion displayed in the option.

8. The method of claim 1, wherein:

the displaying the option includes presenting the user with multiple skill-based options via the user interface in the computing device;

each skill-based option is associated with a different sequence of looped motion; and the option is one of the skill-based options.

9. The method of claim 1, wherein:

the prompting the user comprises presenting the user with guided text instructing the user to perform the sequence of the looped motion displayed in the option;

the displaying the option comprises depicting an on-screen representation of a character performing the sequence of the looped motion;

the determining if the user is performing the looped motion comprises determining if the user motion data matches one or more pre-defined looped motions; and the displaying the user's progress of performing the sequence of the looped motion comprises displaying a progression tracking bar to the user, wherein a filled fraction of the progression tracking bar indicates a percentage of completion of the sequence of the looped motion.

10. One or more processor readable memory storage devices having processor readable code embodied on said one or more processor readable memory storage devices, the processor readable code for programming one or more processors to perform a method comprising:

presenting a user with multiple skill-based options via a user interface in a computing device, each skill-based option is associated with a different sequence of a looped motion;

displaying the different sequences of the looped motion, the different sequences of the looped motion each having different skill levels to performing the associated sequence of the looped motion;

receiving user motion data from a sensor connected to the computing device;

determining if the user is performing one of the looped motions depicted by the multiple skill-based options, based on the received user motion data;

if the user is performing one of the looped motions, determining if the user motion data matches one or more looped motion criteria for the performed loop motion by determining if energy produced through a movement of a body part in the user motion data matches energy of a corresponding moving point in the looped motion, wherein the energy produced through the movement of the body part is derived as a function of a mass of the body part and a speed of the movement of the body part;

determining user's progress of performing the sequence of the looped motion based on the user motion data matching the one or more looped motion criteria;

displaying the user's progress performing the sequence of the looped motion;

determining that the user has completed the sequence of looped motion based on the user's progress of performing the sequence of the looped motion; and automatically triggering a selection of one of the multiple skill-based options in response to determining that the user has completed the sequence of the looped motion.

11. One or more processor readable memory storage devices according to claim 10, wherein:

the multiple skill-based options comprise at least one of a beginner level, an intermediate level and an advanced level corresponding to performing the one or more looped motions.

12. One or more processor readable memory storage devices according to claim 10, wherein determining if the user motion data matches one or more looped motion criteria for the performed loop motion further comprises:

determining if a movement of a body part in the user motion data is aligned with a musical beat sequence associated with the looped motion.

13. One or more processor readable memory storage devices according to claim 10, wherein displaying the user's progress of performing the sequence of the looped motion further comprises:

displaying a progression tracking bar to the user, wherein a filled fraction of the progression tracking bar indicates a percentage of completion of the sequence of the looped motion.

14. One or more processor readable memory storage devices according to claim 10, wherein determining if the user motion data matches one or more looped motion criteria for the performed loop motion further comprises:
determining if a movement of a body part in the user motion data matches a match threshold value associated with the looped motion, wherein the match threshold value is a measure of correlation of the user motion data with the looped motion.

15. An apparatus to perform user selection of an option, comprising:
a depth camera for capturing user motion data of a user in a field of view of the depth camera;
a computing device, including one or more processors and memory, communicatively coupled to the depth camera for receiving the user motion data of the user;
a display device communicatively coupled to and under the control of the computing device;
the computing device causing the display device to display an option and a sequence of a looped motion associated with the option;
the computing device determining if the user is performing the looped motion based on the received user motion data;
if the user is performing the looped motion, the computing device determining if the user motion data matches one or more looped motion criteria by the computing device determining if energy produced through a movement of a body part in the user motion data matches energy of a corresponding moving point in the looped motion, wherein the energy produced through the movement of the body part is derived as a function of a mass of the body part and a speed of the movement of the body part;
the computing device determining the user's progress of performing the sequence of the looped motion based on the user motion data matching the one or more looped motion criteria;
the computing device causing the display to display the user's progress of performing the sequence of the looped motion;
the computing device determining that the user has completed the sequence of looped motion based on the user's progress of performing the sequence of the looped motion;
the computing device automatically triggering a selection of the option displayed in response to determining that the user has completed the sequence of looped motion; and
the computing device performing a function associated with the selection of the option.

16. The apparatus of claim 15, wherein:
the computing device causes the display to display the users' progress of performing the sequence of the looped motion.

17. The apparatus of claim 16, wherein:
the computing device causes the display to display a progression tracking bar, wherein a filled fraction of the progression tracking bar indicates a percentage of completion of the sequence of the looped motion by the user.

18. The apparatus of claim 15, wherein the computing device determining if the user motion data matches one or more looped motion criteria further comprises:
the computing device determining if a movement of a body part in the user motion data is aligned with a musical beat sequence associated with the looped motion.

19. The apparatus of claim 15, wherein the computing device determining if the user motion data matches one or more looped motion criteria further comprises:
determining if a movement of a body part in the user motion data matches a match threshold value associated with the looped motion, wherein the match threshold value is a measure of correlation of the user motion data with the looped motion.

\* \* \* \* \*